(12) United States Patent
Hirakawa et al.

(10) Patent No.: US 9,819,008 B2
(45) Date of Patent: Nov. 14, 2017

(54) NEGATIVE-ELECTRODE STUFF AND NEGATIVE ELECTRODE FOR USE IN LITHIUM-ION SECONDARY BATTERY AS WELL AS LITHIUM-ION SECONDARY BATTERY

(71) Applicant: KABUSHIKI KAISHA TOYOTA JIDOSHOKKI, Kariya-shi, Aichi (JP)

(72) Inventors: Yuichi Hirakawa, Kariya (JP); Manabu Miyoshi, Kariya (JP); Hideaki Shinoda, Kariya (JP); Takayuki Kato, Kariya (JP); Keiichi Hayashi, Kariya (JP); Kayo Mizuno, Kariya (JP); Yoshikatsu Kawabata, Kariya (JP); Megumi Yamamoto, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 0 days.

(21) Appl. No.: 15/370,532

(22) Filed: Dec. 6, 2016

(65) Prior Publication Data
US 2017/0084905 A1    Mar. 23, 2017

Related U.S. Application Data

(62) Division of application No. 14/357,413, filed as application No. PCT/JP2012/006350 on Oct. 3, 2012.

(30) Foreign Application Priority Data

Nov. 11, 2011  (JP) .................................. 2011-247339
Nov. 11, 2011  (JP) .................................. 2011-247357
(Continued)

(51) Int. Cl.
*H01M 4/38*     (2006.01)
*H01M 10/0525*  (2010.01)
(Continued)

(52) U.S. Cl.
CPC ......... *H01M 4/134* (2013.01); *H01M 4/0409* (2013.01); *H01M 4/0471* (2013.01);
(Continued)

(58) Field of Classification Search
CPC ........ H01M 4/38; H01M 4/386; H01M 4/387; H01M 10/0525; H01M 2004/021; H01M 2004/027; Y02T 10/7011
See application file for complete search history.

(56) References Cited

U.S. PATENT DOCUMENTS

| 5,665,491 A | 9/1997 | Tomiyama et al. |
| 2006/0102472 A1 | 5/2006 | Bito et al. |

(Continued)

FOREIGN PATENT DOCUMENTS

| JP | 08-130011 A | 5/1996 |
| JP | 09-223496 A | 8/1997 |

(Continued)

OTHER PUBLICATIONS

English translation of JP Publication 2011-090869, May 2011.*

(Continued)

*Primary Examiner* — Brittany Raymond
(74) *Attorney, Agent, or Firm* — Sughrue Mion, PLLC

(57) ABSTRACT

A negative electrode for lithium-ion secondary battery including a negative electrode that includes a current collector; and a negative-electrode active-material layer formed on a surface of the current collector, and including negative-electrode active-material particles. The negative-electrode active-material particles include an element being capable of sorbing and desorbing lithium ions, and being capable of undergoing an alloying reaction with lithium; or/and an elementary compound being capable of undergoing an alloying reaction with lithium, the negative-electrode active-material particles include particles whose particle diameter
(Continued)

is 1 μm or more in an amount of 85% by volume or more thereof when the entirety is taken as 100% by volume, and exhibit a "$D_{10}$" being 3 μm or more. The negative-electrode active-material layer having a thickness that is 1.4 times or more of a "$D_{90}$" that said negative-electrode active-material particles exhibit.

6 Claims, 9 Drawing Sheets

(30)  Foreign Application Priority Data

Nov. 18, 2011 (JP) .................. 2011-252245
Dec. 27, 2011 (JP) .................. 2011-284860

(51) Int. Cl.
| | |
|---|---|
| *H01M 10/0569* | (2010.01) |
| *H01M 4/134* | (2010.01) |
| *H01M 4/04* | (2006.01) |
| *H01M 4/131* | (2010.01) |
| *H01M 4/48* | (2010.01) |
| *H01M 4/505* | (2010.01) |
| *H01M 4/525* | (2010.01) |
| *H01M 4/62* | (2006.01) |
| *H01M 4/66* | (2006.01) |
| *H01M 4/70* | (2006.01) |
| *H01M 4/02* | (2006.01) |

(52) U.S. Cl.
CPC .......... *H01M 4/131* (2013.01); *H01M 4/38* (2013.01); *H01M 4/381* (2013.01); *H01M 4/386* (2013.01); *H01M 4/387* (2013.01); *H01M 4/483* (2013.01); *H01M 4/505* (2013.01); *H01M 4/525* (2013.01); *H01M 4/623* (2013.01); *H01M 4/625* (2013.01); *H01M 4/661* (2013.01); *H01M 4/70* (2013.01); *H01M 10/0525* (2013.01); *H01M 10/0569* (2013.01); *H01M 2004/021* (2013.01); *H01M 2220/20* (2013.01); *H01M 2220/30* (2013.01); *H01M 2300/004* (2013.01); *Y02T 10/7011* (2013.01)

(56) References Cited

U.S. PATENT DOCUMENTS

| | | |
|---|---|---|
| 2006/0102473 A1 | 5/2006 | Bito et al. |
| 2009/0029256 A1 | 1/2009 | Mah et al. |
| 2009/0035651 A1 | 2/2009 | Hirose et al. |
| 2009/0311585 A1 | 12/2009 | Muraoka et al. |

FOREIGN PATENT DOCUMENTS

| | | | |
|---|---|---|---|
| JP | 10-074504 A | | 3/1998 |
| JP | 2001-118568 A | | 4/2001 |
| JP | 2001-148242 A | | 5/2001 |
| JP | 2002-50353 A | | 2/2002 |
| JP | 2002-373653 A | | 12/2002 |
| JP | 2003-160328 A | | 6/2003 |
| JP | 2004-323284 A | | 11/2004 |
| JP | 2005-116389 A | | 4/2005 |
| JP | 2006-164960 A | | 6/2006 |
| JP | 2007-200862 A | | 8/2007 |
| JP | 2008-098053 A | | 4/2008 |
| JP | 2008-123814 A | | 5/2008 |
| JP | 2008-166013 A | | 7/2008 |
| JP | 2008-262832 A | | 10/2008 |
| JP | 2009-032492 A | | 2/2009 |
| JP | 2009-032693 A | | 2/2009 |
| JP | 2009-205950 A | | 9/2009 |
| JP | 2009-252579 A | | 10/2009 |
| JP | 2009-301937 A | | 12/2009 |
| JP | 2011-049114 A | | 3/2011 |
| JP | 2011-60701 A | | 3/2011 |
| JP | 2011-090869 | * | 5/2011 |
| JP | 2011-090869 A | | 5/2011 |
| JP | 4715848 B2 | | 7/2011 |
| JP | 2004-178922 A | | 6/2014 |
| WO | 2012/077268 A1 | | 6/2012 |

OTHER PUBLICATIONS

Communication dated Dec. 3, 2015 from the Japanese Patent Office in counterpart application No. 2013-542812.
Communication dated Feb. 16, 2016 from the Japanese Patent Office issued in corresponding Japanese Application No. 2015-105656.
Communication dated Mar. 24, 2015 from the Japanese Patent Office in counterpart Application No. 2013-542812.

* cited by examiner

NEGATIVE-ELECTRODE STUFF AND NEGATIVE ELECTRODE FOR USE IN LITHIUM-ION SECONDARY BATTERY AS WELL AS LITHIUM-ION SECONDARY BATTERY

CROSS-REFERENCE TO RELATED APPLICATION

This is a divisional of application Ser. No. 14/357,413, filed May 9, 2014, which is a National Stage of International Application NO. PCT/JP2012/006350, filed Oct. 3, 2012, claiming priority from Japanese Patent Application Nos. 2011-247339 and JP 2011-247357, filed Nov. 11, 2011, JP 2011-252245, filed Nov. 18, 2011, and JP 2011-284860, filed Dec. 27, 2011, the contents of which are hereby incorporated by reference into this application.

TECHNICAL FIELD

The present invention relates to a negative-electrode material and a negative electrode, which enables Li ions to be occluded (or sorbed) therein and released (or desorbed) therefrom, for use in lithium-ion secondary battery, as well as to a lithium-ion secondary battery.

BACKGROUND ART

Since lithium-ion secondary batteries have small sizes and large capacities, they have been used in a wide range of areas, such cellular phones and notebook-size personal computers. Moreover, in recent years, they have been about to be used in hybrid vehicles and electric vehicles as well.

A lithium-ion secondary battery is constituted of a positive electrode, a negative electrode, an electrolytic solution, and a separator. The positive electrode comprises: a positive-electrode active material comprising a metallic composite oxide of lithium and transition metal, such as lithium-manganese composite oxides, lithium-cobalt composite oxides and lithium-nickel composite oxides, for instance; and a current collector covered with the positive-electrode active material.

The negative electrode is formed by covering a current collector with a negative-electrode material comprising a negative-electrode active material that enables lithium ions to be sorbed therein and desorbed therefrom. Negative-electrode active-material particles comprise a negative-electrode active material being capable of sorbing and desorbing lithium ions. Recently, it has been investigated to employ compounds, which include silicon (Si) or tin (Sn), or which include these two elements, for the particles. Negative-electrode active-material particles, which comprise silicon and tin, or which comprise a compound including the two, are expanded or contracted volumetrically by means of the sorbing and desorbing of lithium ions. A film is formed on a surface of the negative-electrode active-material particles at the time of charging, and thereby an electrolytic solution is prevented from contacting directly with the negative-electrode active-material particles so that the electrolytic solution is suppressed from deteriorating. This film, however, might possibly associate with such a case where the volumetric changes of the negative-electrode active-material particles have caused cracks to occur therein. When cracks arise in the film, there might possibly arise such a fear that the electrolytic solution has contacted directly with the negative-electrode active material, and thereby the electrolytic solution has been deteriorated, so that the resulting cyclability of charging and discharging has declined.

Conventionally, attempts have been carried out in order to upgrade battery characteristics, such as the cyclability, by adjusting the particle diameters of negative-electrode active materials that constitute the negative-electrode material. For example, Patent Literature Nos. 1, 2 and 3 disclose to upgrade the cyclability and charging/discharging characteristics of batteries by adjusting the BET specific surface area of silicon composite powders, which serve as a negative-electrode active material, within predetermined ranges.

Patent Literature No. 4 sets forth that a proportion of fine particles, which are included in a negative-electrode active-material powder and whose particle diameter is 5 μm or less, is set at 20% or less to moderately keep the contact between a conductive-additive powder and a negative-electrode active-material powder, thereby upgrading the resulting discharge capacities and initial charge and discharge capacities.

Patent Literature Nos. 5, 6 and 7 disclose to upgrade the resulting discharge capacities and cyclability by adjusting the average particle diameter (or "$D_{50}$") of a silicon oxide powder within a predetermined range.

Moreover, in recent years, investigations have been made as to the components within electrolytic solutions, and as to the grain size of negative-electrode active-material particles. Patent Literature No. 8 shows the following: using a silicon oxide as a negative-electrode active material; setting negative-electrode active-material particles' median diameter at from 5 μm or more to 200 μm or less; and adding fluoroethylene carbonate (or FEC) to an electrolytic solution. Patent Literature No. 9 shows that it is good to even carry out a classifying operation in order to set up the average particle size of a negative-electrode material so as to be 5-40 μm. Patent Literature No. 10 shows using SiO, a negative-electrode active material, which includes particles whose average particle diameter is 15 μm but which does not include any particles whose particle diameter is 5 μm or less in an amount of 10% or more. Patent Literature No. 2 shows the following: classifying SiO after pulverizing it; and using a powder whose average particle diameter is 5 μm and grain-size distribution is 1-10 μm. Patent Literature No. 11 has a such description that particles containing a silicon compound do not include practically any particles whose average particle diameter is 0.1 μm or less. Patent Literature Nos. 12, 13, 14 and 15 show adding FEC to electrolytic solutions.

RELATED TECHNICAL LITERATURE

Patent Literature

Patent Literature No. 1: Japanese Unexamined Patent Publication (KOKAI) Gazette No. 2004-323284 (Paragraph "0013");

Patent Literature No. 2: Japanese Unexamined Patent Publication (KOKAI) Gazette No. 2008-166013 (Paragraph "0018");

Patent Literature No. 3: Japanese Unexamined Patent Publication (KOKAI) Gazette No. 2001-118568 (Paragraphs "0021" and "0025");

Patent Literature No. 4: Japanese Unexamined Patent Publication (KOKAI) Gazette No. 2005-116389 (Paragraph "0026");

Patent Literature No. 5: Japanese Unexamined Patent Publication (KOKAI) Gazette No. 2003-160328 (Paragraph "0015");

Patent Literature No. 6: Japanese Unexamined Patent Publication (KOKAI) Gazette No. 2009-301937 (Paragraph "0013");

Patent Literature No. 7: Japanese Unexamined Patent Publication (KOKAI) Gazette No. 2002-373653 (Paragraph "0011");

Patent Literature No. 8: Japanese Unexamined Patent Publication (KOKAI) Gazette No. 2009-252579 (Paragraphs 266 and 278);

Patent Literature No. 9: Japanese Unexamined Patent Publication (KOKAI) Gazette No. 10-074504 (Paragraph 19);

Patent Literature No. 10: Japanese Unexamined Patent Publication (KOKAI) Gazette No. 2001-148242 (Paragraphs 22 and 41);

Patent Literature No. 11: Japanese Unexamined Patent Publication (KOKAI) Gazette No. 2004-178922 (Claim 11);

Patent Literature No. 12: Japanese Unexamined Patent Publication (KOKAI) Gazette No. 2007-200862 (Paragraph 63);

Patent Literature No. 13: Japanese Unexamined Patent Publication (KOKAI) Gazette No. 2011-049114 (Paragraph 45);

Patent Literature No. 14: Japanese Unexamined Patent Publication (KOKAI) Gazette No. 2008-098053 (Paragraph 103); and Japanese Patent Gazette No. 4715848 (Claim 1)

SUMMARY OF THE INVENTION

Assignments to be Solved by the Invention

The present inventors further repeated their search for the particle diameters of negative-electrode active materials wholeheartedly in order to upgrade the resulting batteries' cyclability and discharge capacities.

Moreover, the present inventors repeated their search for the particle diameters of negative-electrode active materials and the constitutions of negative electrodes wholeheartedly in order to upgrade and stabilize the resulting batteries' characteristics as to cases where negative-electrode active-material particles being accompanied by the volumetric changes at the time of charging and discharging are used.

Moreover, the present inventors studied variously for the grain sizes of negative-electrode active-material particles and the components of electrolytic solutions wholeheartedly in order to upgrade the resulting batteries' characteristics by methods that differ from those having been heretofore done conventionally.

The present invention is one which has been done in view of such circumstances. It is a first assignment thereto to provide a negative-electrode material upgrading the resulting batteries' cyclability, as well as a negative electrode and lithium-ion secondary battery that use the same.

It is a second assignment thereto to provide a negative-electrode material making it possible to make the resulting discharge capacities larger, as well as a negative electrode, lithium-ion secondary battery and vehicle that use the same.

A third assignment thereto associates with a negative electrode for lithium-ion secondary battery, negative electrode which upgrades the resulting batteries' characteristics and enables them to stabilize, and with a lithium-ion secondary battery.

It is a fourth assignment thereto to provide a lithium-ion secondary battery excelling in the battery characteristics.

Means for Solving the Assignments

The present inventors came to find and know that controlling the particle diameters of negative-electrode active-material particles leads to increasing the resulting batteries' charging/discharging cyclability and discharge capacities. In particular, when the entirety of negative-electrode active-material particles included in a negative-electrode material is taken as 100% by volume, letting 85% by volume or more of them exhibit a particle diameter of 1 µm or more results in inhibiting cracks from occurring in a film which is formed on a surface of the negative-electrode active-material particles, and thereby electrolytic solutions are inhibited from contacting with negative-electrode active materials constituting the negative-electrode active-material particles to deteriorate, so that the resultant cyclability upgrades. Moreover, controlling a "$D_{50}$" and grain-size range of negative-electrode active-material particles within a predetermined range results in making the internal impedance of the negative-electrode active-material particles and the impedance at the interface between the particles smaller, thereby causing the resulting discharge capacities to upgrade. The following respective modes according to the present invention are inventions that were completed based mainly on the above-mentioned findings and knowledge. Note that the "$D_{50}$" designates a particle diameter at which a volumetric-distribution accumulated value is equivalent to 50% in a grain-size distribution measurement by means of laser diffraction method. In other words, the "$D_{50}$" designates a median diameter that is measured on the volumetric basis.

(1) A negative-electrode material for lithium-ion secondary battery according to a first mode of the present invention is characterized in that:

the negative-electrode material comprises negative-electrode active-material particles including:

an element being capable of sorbing and desorbing lithium ions, and being capable of undergoing an alloying reaction with lithium; or/and an elementary compound being capable of undergoing an alloying reaction with lithium;

said negative-electrode active-material particles including particles whose particle diameter is 1 µm or more in an amount of 85% by volume or more thereof when the entirety is taken as 100% by volume; exhibiting a BET specific surface area that is 6 m$^2$/g or less; and exhibiting a "$D_{50}$" that is 4.5 µm or more.

A negative electrode for lithium-ion secondary battery according to the present invention is characterized in that the negative electrode comprises said negative-electrode material for lithium-ion secondary battery.

A lithium-ion secondary battery according to the present invention is characterized in that the lithium-ion secondary battery comprises:

said negative electrode;

a positive electrode including a positive-electrode active material that enables lithium ions to be sorbed therein and desorbed therefrom; and an electrolyte.

(2) A negative-electrode material for lithium-ion secondary battery according to a second mode of the present invention is characterized in that:

the negative-electrode material comprises negative-electrode active-material particles including:

an element being capable of sorbing and desorbing lithium ions, and being capable of undergoing an alloying reaction with lithium; or/and an elementary compound being capable of undergoing an alloying reaction with lithium;

said negative-electrode active-material particles exhibiting a BET specific surface area that is 6 m$^2$/g or less; exhibiting a "$D_{50}$" that is from 4.5 µm or more to 8.0 µm or less; and exhibiting a grain size that falls in a range of from 0.4 μm or more to 30 μm or less.

A negative electrode for lithium-ion secondary battery according to the present invention is characterized in that the negative electrode comprises said negative-electrode material for lithium-ion secondary battery.

A lithium-ion secondary battery according to the present invention is characterized in that the lithium-ion secondary battery comprises:
said negative electrode;
a positive electrode including a positive-electrode active material that enables lithium ions to be sorbed therein and desorbed therefrom; and
an electrolyte.

(3) A negative-electrode for lithium-ion secondary battery according to a third mode of the present invention is characterized in that it is a negative electrode for lithium-ion secondary battery, the negative electrode comprises:
a current collector; and
a negative-electrode active-material layer formed on a surface of the current collector, and including negative-electrode active-material particles;
said negative-electrode active-material particles comprising:
an element being capable of sorbing and desorbing lithium ions, and being capable of undergoing an alloying reaction with lithium; or/and
an elementary compound being capable of undergoing an alloying reaction with lithium;
said negative-electrode active-material particles including particles whose particle diameter is 1 μm or more in an amount of 85% by volume or more thereof when the entirety is taken as 100% by volume; and
said negative-electrode active-material layer having a thickness that is 1.4 times or more of a "$D_{90}$" that said negative-electrode active-material particles exhibit. Note that, for the element being capable of undergoing an alloying reaction with lithium, the following can be given: Na, K, Rb, Cs, Fr, Be, Mg, Ca, Sr, Ba, Ra, Ti, Ag, Zn, Cd, Al, Ga, In, Si, Ge, Sn, Pb, Sb, and Bi.

A lithium-ion secondary battery according to the present invention is characterized in that it comprises:
the negative electrode for lithium-ion secondary battery, the negative electrode as set forth above;
a positive electrode including a positive-electrode active material that enables lithium ions to be sorbed therein and desorbed therefrom; and
an electrolyte.

(4) A lithium-ion secondary battery according to a fourth mode of the present invention is characterized in that the lithium-ion secondary battery comprises:
a negative electrode including negative-electrode active-material particles that comprise:
an element being capable of sorbing and desorbing lithium ions, and being capable of alloying with lithium; or/and
an elementary compound including an element that is capable of alloying with lithium;
a positive electrode including a positive-electrode active material that enables Li ions to be sorbed therein and desorbed therefrom; and
an electrolytic solution made by dissolving an electrolyte in a solvent;
said negative-electrode active-material particles including particles whose particle diameter is 1 μm or more in an amount of 85% by volume or more thereof when the entirety of said negative-electrode active-material particles, which are included in said negative electrode, is taken as 100% by volume;
said solvent in said electrolytic solution including fluorinated ethylene carbonate.

Effect of the Invention (1) In accordance with the first mode of the present invention, it is possible to provide a negative-electrode material that can cause the resulting batteries' cyclability to upgrade, as well as a negative electrode that uses the same, as well as a lithium-ion secondary battery.

(2) In accordance with the second mode of the present invention, it is possible to provide a negative-electrode material that can make the resulting discharge capacities larger, as well as a negative electrode that uses the same, as well as a lithium-ion secondary battery.

(3) In accordance with the negative electrode for lithium-ion secondary battery according to the third mode of the present invention, it is possible to cause the resulting batteries' characteristics to upgrade and stabilize, because the negative-electrode active-material particles exhibit the above-mentioned particle-diameter characteristic, and because the thickness of the negative-electrode active-material layer has the above-mentioned relationship with the particle-diameter characteristic of the negative-electrode active-material particles. Moreover, the lithium-ion secondary battery according to the present invention can materialize upgrading and stabilizing the resultant batteries' characteristics, because the aforementioned negative electrode is used. In addition, in accordance with a vehicle according to the present invention, it is possible to stably demonstrate higher outputs for a longer period of time, because the aforementioned lithium-ion secondary battery is used.

(4) The lithium-ion secondary battery according to the fourth mode of the present invention excels in the resulting battery characteristics, because the negative-electrode active-material particles include particles whose particle diameter is 1 μm or more in an amount of 85% by volume or more of them when the entirety of the negative-electrode active-material particles, which are included in the negative electrode, is taken as 100% by volume, and because the solvent in the electrolytic solution includes fluorinated ethylene carbonate. Moreover, a vehicle according to the present invention can demonstrate higher outputs for a longer period of time, because it has the lithium-ion secondary battery, which excels in the battery characteristics, on-board.

Figure 1:
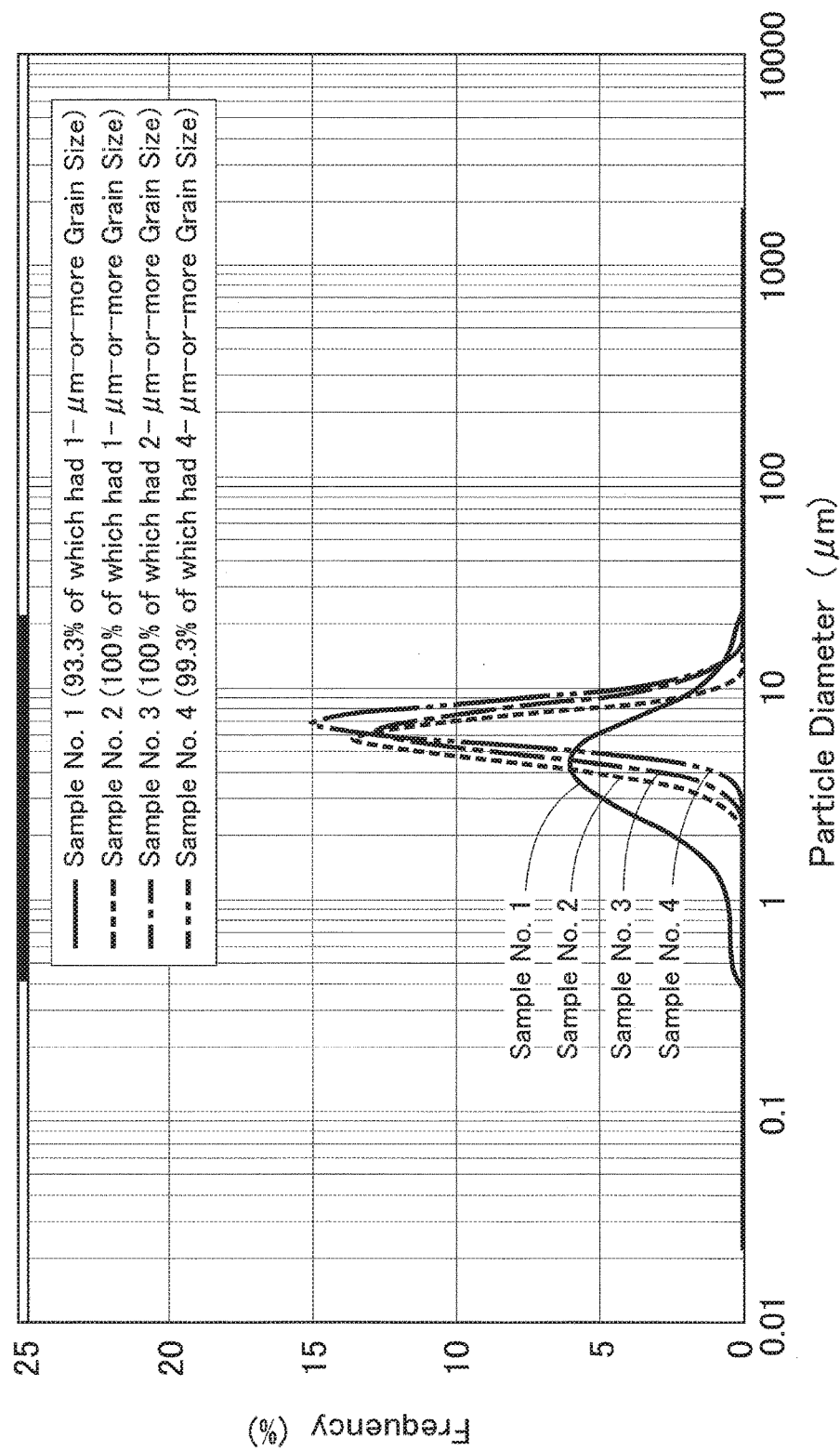
FIG. 1 is a curve diagram that shows the grain-size distributions of Sample Nos. 1 through 4.

MODES FOR CARRYING OUT THE INVENTION (1) Detailed explanations will be made hereinafter on embodiments according to the first mode of the present invention.

A negative-electrode material of an embodiment according to the first mode is characterized by the following:
being a negative-electrode material comprising:
an element being capable of sorbing and desorbing lithium ions, and being capable of undergoing an alloying reaction with lithium; or/and
an elementary compound being capable of undergoing an alloying reaction with lithium; and
said negative-electrode active-material particles including particles whose particle diameter is 1 µm or more in an amount of 85% by volume or more of them when the entirety is taken as 100% by volume; exhibiting a BET specific surface area that is 6 m$^2$/g or less; and exhibiting a "$D_{50}$" that is 4.5 µm or more.

In this instance, the resulting batteries' cyclability upgrades. The reasons are believed to be as follows.

When the entire negative-electrode active-material particles are taken as 100% by volume, letting the negative-electrode active-material particles include particles whose particle diameter is 1 µm or more in an amount of 85% or more of them leads to suppressing fine particles in the negative-electrode active-material particles extremely less compared with such particles which have been available heretofore conventionally, and to making the BET specific surface area smaller, and moreover to making the "$D_{50}$" larger. When the BET specific surface area becomes smaller, and when the "$D_{50}$" becomes larger, a relatively-thin stable film is formed on a surface of the negative-electrode active-material particles. The negative-electrode active-material particles expand and contract, because they comprise an element being capable of sorbing and desorbing lithium ions and are capable of undergoing an alloying reaction with lithium or/and an elementary compound being capable of undergoing an alloying reaction with lithium, and accordingly because they sorb and desorb Li ions. When the negative-electrode active-material particles expand and contract, stresses applied to an outer surface of the film can be reduced because the film on the negative-electrode active-material particles' surface is thin relatively, and accordingly it is possible to suppress cracks or deficiencies from arising in the film's outer surface. Hence, the negative-electrode active-material particles are less likely to contact with electrolytic solutions, and thereby it is possible to suppress Li ions, which exist in the negative-electrode active-material particles, from eluting out, so that it is possible to suppress decomposition reactions of the electrolytic solutions. Therefore, it is possible to enhance the resulting batteries' cyclability.

The negative-electrode active-material particles include particles, which possess a particle diameter of 1 µm or more, in an amount of 85% by volume or more of them when the entirety is taken as 100% by mass. The "particle diameter" shall be an effective diameter that is calculated by comparing an actually-measured diffraction pattern with a theoretical diffraction pattern that is obtainable by means of laser diffraction/scatter method assuming that particles of interest are spheres.

In a case where the negative-electrode active-material particles include particles, which possess a particle diameter of 1 µm or more, in an amount of less than 85% by volume when the entire negative-electrode active-material particles are taken as 100% by volume, the BET specific surface area of the entire negative-electrode active-material particles becomes larger, so that the film thickness of a film, which is formed at the time of charging, becomes larger. Since a film with a larger film thickness is less likely to follow the negative-electrode active-material particles' volumetric changes, cracks are likely to arise therein. Consequently, there might possibly arise such a fear that the negative-electrode active-material particles have contacted directly with electrolytes to decompose the electrolytes. Accordingly, there might possibly arise such a fear that the resulting batteries' cyclability has declined.

In addition, it is allowable that the negative-electrode active-material particles can include particles, which possess a particle diameter of 1 µm or more, in an amount of 95% by volume or more of them when the entirety is taken as 100% by volume. In this instance, fine particles, whose particle diameter is less than 1 µm, comes to be present in a much less trace amount within the negative-electrode active-material particles, so that the negative-electrode active-material particles, on which a film with a thinner thickness is formed, come to be present more, and thereby cracks, which result from the negative-electrode active-material particles' volumetric changes, become less likely to occur in the film, so that it is possible to further suppress the deteriorations of electrolytic solutions.

In addition, it is desirable that all of the negative-electrode active-material particles can have a particle diameter of 1 µm or more. In this instance, cracks become much less likely to occur in the resulting films, so that it is possible to effectively inhibit electrolytic solutions from deteriorating.

In addition, it is preferable that the negative-electrode active-material particles can include particles, which possess a particle diameter of 2 µm or more in an amount of 85% by volume or more of them when the entirety is taken as 100% by volume. In this instance, the film thickness of the resulting films becomes much thinner, and thereby cracks are less likely to arise in the resultant films, so that it is possible to effectively suppress the decompositions of electrolytes.

The negative-electrode active-material particles exhibit a BET specific surface area of 6 m$^2$/g or less. In a case where the BET specific surface area of the negative-electrode active-material particles exceeds 6 m$^2$/g, there might possibly arise such a fear that the resulting discharge-capacity maintenance rate has declined. The "BET specific surface area" is determined by a method in which molecules with a known adsorption occupation area are adsorbed on a surface of particles of interest to find a specific surface area of the particles from an adsorbed amount of the molecules.

It is allowable that the negative-electrode active-material particles' BET specific surface area can be 5 m²/g or less. Furthermore, it is preferable that the BET specific surface area can be 4 m²/g or less, or it is desirable that the BET specific surface area can be 3.3 m²/g or less. In these instances, the resulting discharge-capacity maintenance rate further upgrades.

It is allowable that the negative-electrode active-material particles' BET specific surface area can be 2.0 m²/g or more. Furthermore, it is preferable that the BET specific surface area can be 2.5 m²/g or more, or it is desirable that the BET specific surface area can be 2.8 m²/g or more. In these instances, it is possible to make a mutual contact area between the negative-electrode active-material particles larger, and thereby it is possible to make more conductive paths for electrons, so that it is possible to demonstrate a larger first-round discharge capacity.

When the negative-electrode active-material particles exhibit a "$D_{50}$" that is less than 4.5 µm, there might possibly arise such a fear that the resulting batteries' cyclability has declined. The "$D_{50}$" herein designates a particle diameter at which a volumetric-distribution accumulated value is equivalent to 50% in a grain-size distribution measurement by means of laser diffraction method.

It is allowable that the negative-electrode active-material particles' "$D_{50}$" can be 5.5 µm or more. Furthermore, it is preferable that the "$D_{50}$" can be 5.7 µm or more. In these instances, the resulting batteries' cyclability further upgrades.

It is allowable that the negative-electrode active-material particles' "$D_{50}$" can be 8.0 µm or less. Furthermore, it is preferable that the "$D_{50}$" can be 7.5 µm or less. When the negative-electrode active-material particles' "$D_{50}$" is too large, there might possibly arise such a fear that the reactive resistance of the negative-electrode active-material particles (or the resistance against Li ions that diffuse into the inside of negative-electrode active material) has augmented.

It is preferable that the negative-electrode active-material particles can exhibit a grain-size range falling within a range of from 0.4 µm or more to 30 µm or less. The "grain-size range" herein refers to the negative-electrode active-material particles' particle diameters. "A grain-size range falling in a range of from 0.4 µm or more to 30 µm or less" herein refers to the fact that the negative-electrode active-material particles' particle diameters fall within a range of from 0.4 µm or more to 30 µm or less. When the entire negative-electrode active-material particles are taken as 100% by volume, it is preferable that a proportion of the negative-electrode active-material particles, which possess particle diameters falling within the aforementioned grain-size range, can account for 95% by volume or more among them all. The "particle diameter" shall be an effective diameter that is calculated by comparing an actually-measured diffraction pattern with a theoretical diffraction pattern that is obtainable by means of laser diffraction/scatter method assuming that particles of interest are spheres.

In a case where the negative-electrode active-material particles whose particle diameter is less than 0.4 µm are included, there might possibly arise such a fear that, a film, which generates at the time of charging, has become thicker. Consequently, there might possibly arise such a fear that the resulting batteries' cyclability has declined, because the film's resistance augments. In another case where the negative-electrode active-material particles, whose particle diameters become so large excessively to exceed 30 µm, are included, there might possibly arise such a fear that the resultant capacities have declined, because the resistance against Li ions that diffuse into the particles' inside becomes larger. Moreover, inside the particles, parts that can contribute to battery reactions, and the other parts that cannot contribute to them have arisen, so that the extents of expansion and contraction have come to differ within the particles, and thereby cracks have arisen within the particles, so that there might possibly arise such a fear that the resulting capacity maintenance rate has declined.

It is allowable that the negative-electrode active-material particles' grain-size range can be from 0.5 µm or more to 30 µm or less, or it is desirable that the grain-size range can be from 1.0 µm or more to 20 µm or less, or from 1.37 µm or more to 18.5 µm or less. In these instances, the resulting cyclability further upgrades.

It is preferable that the negative-electrode active-material particles can exhibit a "$D_{10}$" that is 3 µm or more. The reason is as follows: fine particles come to be present much less in the negative-electrode active-material particles because of the fact that the negative-electrode active-material particles' "$D_{10}$" is 3 µm or more. Consequently, a film, which is formed on a surface of the negative-electrode active-material particles, becomes thin relatively, and thereby stresses applied to an outer surface of the film can be reduced, so that it is possible to suppress cracks or deficiencies from arising in the film's outer surface. Accordingly, the negative-electrode active-material particles are less likely to contact with electrolytic solutions, and thereby it is possible to suppress Li ions, which exist in the negative-electrode active-material particles, from eluting out, so that it is possible to suppress decomposition reactions of the electrolytic solutions. Therefore, it is possible to enhance the resulting batteries' cyclability. The "$D_{10}$" herein designates a particle diameter at which a volumetric-distribution accumulated value is equivalent to 10% in a grain-size distribution measurement by means of laser diffraction method.

In addition, it is allowable that the negative-electrode active-material particles' "$D_{10}$ can be 3.4 µm or more. Furthermore, it is preferable that the "$D_{10}$" can be 4.0 µm or more. In these instances, the resulting batteries' cyclability further upgrades.

It is allowable that the negative-electrode active-material particles' "$D_{10}$" can be 6.0 µm or less. Furthermore, it is preferable that the "$D_{10}$" can be 5.5 µm or less. When the negative-electrode active-material particles' "$D_{10}$" is too large, there might possibly arise such a fear that the reactive resistance of the negative-electrode active-material particles (or the resistance against Li ions that diffuse into the inside of negative-electrode active material) has augmented.

It is preferable that the negative-electrode active-material particles can exhibit a "$D_{90}$" that is so large to exceed 8.0 µm or more. In this instance, the resulting cyclability further upgrades. The reason is as follows: the negative-electrode active-material particles whose particle diameter is larger come to be present much more when the negative-electrode active-material particles' "$D_{90}$" is so large to exceed 8.0 µm or more. Consequently, a film, which is formed on a surface of the negative-electrode active-material particles, becomes thin relatively, and thereby cracks or deficiencies can be suppressed from arising in the film's outer surface, so that it is possible to effectively suppress the decomposition reactions of electrolytic solutions. Therefore, it is possible to enhance the resultant batteries' cyclability. Note that the "$D_{90}$" herein designates a particle diameter at which a volumetric-distribution accumulated value is equivalent to 90% in a grain-size distribution measurement by means of laser diffraction method.

In addition, it is allowable that the negative-electrode active-material particles' "$D_{90}$" can be 8.5 μm or more. Furthermore, it is preferable that the "$D_{90}$" can be 9.0 μm or more. In these instances, the resulting batteries' cyclability further upgrades.

It is allowable that the negative-electrode active-material particles' "$D_{90}$" can be 12 μm or less. Furthermore, it is preferable that the "$D_{90}$" can be 10.5 μm or less. When the negative-electrode active-material particles' "$D_{90}$" is too large, there might possibly arise such a fear that the internal resistance of the negative-electrode active-material particles (or the resistance against Li ions that diffuse into the inside of negative-electrode active material) has augmented.

A film can be formed on a surface of the negative-electrode active-material particles. The film can be a solid electrolyte interphase (or SEI) film that is formed on the negative-electrode active-material particles' surface at the time of charging. Covering the negative-electrode active-material particles' surface with a solid electrolyte interface film leads to preventing the negative-electrode active-material particles from contacting directly with electrolytic solutions, so that it is possible to suppress the electrolytic solutions from decomposing. In particular, since the negative-electrode active-material particles have the above-mentioned particle-diameter characteristics in the present invention, fine particles are present less therein, so that a volumetric ratio of the film can be suppressed lower with respect to a unit volume of the negative-electrode active-material particles. Accordingly, it is possible to reduce stresses resulting from the negative-electrode active-material particles' volumetric changes to be applied to the film, so that it is possible to suppress defects, such as cracks, from arising in the film. Accordingly, the negative-electrode active-material particles can be suppressed from contacting directly with electrolytes, and thereby it is possible to suppress decomposition reactions of the electrolytes, so that it is possible to cause the resulting batteries' cyclability to upgrade.

It is preferable that said negative-electrode active-material particles' BET specific surface area can be 5 m$^2$/g or less, that said negative-electrode active-material particles' "$D_{50}$" can be from 5.0 μm or more to 8.0 μm or less, and that said negative-electrode active-material particles' grain-size range can be from 0.4 μm or more to 20 μm or less. In this instance, the resulting first-round discharge capacity becomes larger. The reason is believed to be as follows. The negative-electrode active-material particles' reactive resistance indicates the resistance of a film on the negative-electrode active-material particles, and the resistance against Li ions, which diffuse into the particles' inside, at the interface between the particles. The smaller the negative-electrode active-material particles' particle diameter becomes the smaller the reactive resistance becomes. When a film is formed on a surface of the negative-electrode active-material particles, the thinner the film becomes at the interface between the particles the smaller the resistance of the film on the negative-electrode active-material particles becomes. On the contrary, the smaller the negative-electrode active-material particles' particle diameter is the thicker the film is formed. Thus, it is possible to make the resultant negative electrodes' reactive resistance smaller by setting the particle diameter to fall within such a well-balanced range that enables the particle diameter to make the resulting film thinner to such an extent that hardly makes the resistance greater against the diffusion of Li ions into the particles' inside, so that it is possible to make the resultant discharge capacities larger.

It is preferable that the negative-electrode active-material particles' "$D_{50}$" can be from 5.7 μm or more to 7.2 μm or less. In this instance, it is possible to set the particle diameter at such particle diameters that are balanced well in order to make the negative-electrode active-material particles' reactive resistance smaller, so that it is possible to make the resulting batteries' capacities much larger.

It is preferable that the negative-electrode active-material particles' BET specific surface area can be from 2.5 m$^2$/g or more to 5.0 m$^2$/g or less. Furthermore, it is desirable that the BET specific surface area can be from 2.5 m$^2$/g or more to 4.0 m$^2$/g or less, or can be from 2.7 m$^2$/g or more to 3.3 m$^2$/g or less. In these instances, it is possible to give the negative-electrode active-material particles a particle diameter falling within such a well-balanced range that enables the particle diameter to make the resulting film thinner to such an extent that hardly makes the resistance greater against the diffusion of Li ions into the particles' inside, so that the resulting discharge capacities become much larger.

It is preferable that the negative-electrode active-material particles' "$D_{90}$" can be so large to exceed 8.0 μm. Furthermore, it is desirable that the "$D_{90}$" can be 8.5 μm or more, or can be 9.0 μm or more. In these instances, the resulting discharge capacities become larger much more.

In addition, it is allowable that the negative-electrode active-material particles' grain-size range can be from 1.0 μm or more to 18.5 μm or less, or it is preferable that the grain-size range can be from 1.37 μm or more to 18.5 μm or less. In these instances, the resulting discharge capacities become much higher.

Moreover, it is also allowable that a negative-electrode material according to the present invention can be a negative-electrode material comprising negative-electrode active-material particles including: an element being capable of sorbing and desorbing lithium ions, and being capable of undergoing an alloying reaction with lithium; or/and an elementary compound being capable of undergoing an alloying reaction with lithium, wherein said negative-electrode active-material particles include particles whose particle diameter is 1 μm or more in an amount of 85% by volume or more of them when the entirety is taken as 100% by volume; and exhibit a BET specific surface area that is 6 m$^2$/g or less. In this instance, too, the resulting cyclability upgrades, because fine negative-electrode active-material particles are present less.

For adjusting the grain size of the negative-electrode active-material particles, the following methods are available, for instance: cyclone classifications, dry type classifications (e.g., weight classifications, inertia classifications, and centrifugal classifications), wet type classifications (e.g., sedimentation classifications, mechanical classifications, hydraulic classifications, and centrifugal classifications), sieving classifications, and the like.

It is preferable that a cyclone classification can be carried out using a forced-vortex centrifuge-type precision pneumatic classifier. For example, a cyclone classification, in which a forced-vortex centrifuge-type precision pneumatic classifier is used, is a classification in which swirling motions are given to particles in order to separate the particles into particles having larger grain sizes and other particles having smaller grain sizes by means of the balance between centrifugal forces acting the particles and drag or reactive forces against the centrifugal forces. For example, the classification is a method for classifying powders, the method comprising the steps of: rotating a classifying rotor having classifying blades at a high speed within a casing; charging powders from above the rotating classifying rotor; and causing the rotating classifying rotor to produce centrifugal forces in the charged powder, and simultaneously introducing air from the classifying rotor's peripheral rim toward the center, thereby flowing out larger-particle-diameter powders, which are more susceptible to the centrifugal forces resulting from the rotating classifying rotor, toward the classifying rotor's outer side, whereas moving smaller-particle-diameter powders, which are more susceptible to actions resulting from an air flow than to the centrifugal forces, in the centripetal direction, along with the introduced air.

In order to classifying the negative-electrode active-material particles, which exhibit the BET specific surface area, "$D_{10}$," "$D_{50}$," "$D_{90}$" and grain-size range that fall in the above-mentioned predetermined ranges, by means of a cyclone classifying method using a forced-vortex centrifuge-type precision pneumatic classifier, it is allowable that a revolving speed of the classifier's centrifugal machine can be from 3,000 rpm or more to 10,000 rpm or less. Moreover, it is permissible that a supplying rate of the negative-electrode active-material particles can be from 0.5 kg/hour or more to 2.0 kg/hour or less. Moreover, it is preferable that an air-flow volume can be from 1.5 m$^3$/minute or more to 3.5 m$^3$/minute or less.

The negative-electrode active-material particles comprise an element, which is capable of sorbing and desorbing lithium ions and is capable of alloying with lithium, or/and an elementary compound, which is capable of alloying with lithium.

Said element, which is capable of alloying with lithium, can be silicon (Si), or tin (Sn). It is allowable that said elementary substance, which is capable of alloying with lithium, can be a silicon compound, or a tin compound. It is permissible that the silicon compound can be SiO$_x$ (where 0.5≤"x"≤1.5). As the tin compound, tin alloys (such as Cu—Sn alloys or Co—Sn alloys), and the like, can be given, for instance.

Even among those above, the negative-electrode active-material particles can comprise silicon (Si). Furthermore, they can comprise SiO$_x$ (where 0.5≤"x"≤1.5). Silicon has a larger theoretical capacity. On the other hand, since silicon exhibits larger volumetric changes at the time of charging and discharging, using SiO$_x$ instead makes it possible to make volumetric changes less.

Moreover, it is preferable that the negative-electrode active-material particles can possess an Si phase, and an SiO$_2$ phase. This Si phase comprises a silicon elementary substance, is a phase enabling Li ions to be sorbed therein and desorbed therefrom, and expands and contracts being accompanied by the sorbing and desorbing of Li ions. The SiO$_2$ phase comprises SiO$_2$, and absorbs the expansions and contractions of the Si phase. Covering the Si phase with the SiO$_2$ phase can lead to forming the negative-electrode active-material particles that comprise the Si phase and the SiO$_2$ phase. Furthermore, covering a plurality of the Si phases, which have been turned into fine particles, with the SiO$_2$ phase can result in uniting them one another, thereby forming a particle, namely, each of the negative-electrode active-material particles. In this instance, it is possible to effectively suppress the volumetric changes of the entire negative-electrode active-material particles.

It is preferable that a mass ratio of the SiO$_2$ phase with respect to the Si phase in the negative-electrode active-material particles can be from 1 to 3. When said mass ratio is less than 1, the expansions and contractions of the negative-electrode active-material particles are so great that there might possibly arise such a fear that cracks have arisen in a negative-electrode active-material layer that is constituted of the negative-electrode active-material particles. On the other hand, when said mass ratio exceeds 3, the sorbing and desorbing amounts of Li ions in the negative-electrode active-material particles are so less that there might possibly arise such a fear that the resulting discharge capacities have become lower.

The negative-electrode active-material particles can even be constituted of the Si phase and SiO$_2$ phase alone. Moreover, although the negative-electrode active-material particles have the Si phase, and the SiO$_2$ phase, as the major components, it is allowable that, in addition to those above, known active materials can also be included as other components of the negative-electrode active-material particles. To be concrete, at least one member of Me$_x$Si$_y$O$_z$ (where "Me" stands for Li, Ca, and the like) can be further admixed in the negative-electrode active-material particles.

As a raw material for the negative-electrode active-material particles, a raw-material powder including silicon monoxide can be used. In this instance, silicon monoxide within the raw-material powder disproportionates into two layers, the SiO$_2$ phase and the Si phase. In the disproportionation of silicon monoxide, silicon monoxide (e.g., SiO$_n$, where "n" is 0.5≤"n"≤1.5), which makes a homogeneous solid whose atomic ratio between Si and O is roughly 1:1, separates into two layers, the SiO$_2$ phase and the Si phase, by means of reactions inside the solid. Thus, silicon monoxide powders, which are obtainable by means of the disproportionation, include the SiO$_2$ phase, and the Si phase.

The disproportionation of silicon monoxide in a raw-material powder progresses by means of giving an energy to the raw-material power. As one of the examples, a method, such as heating or milling the raw-material powder, can be given.

In general, it has been said that, as far as being in a state of being cut off from oxygen, almost all of silicon monoxide disproportionate to separate into the two phases at 800° C. or more. To be concrete, a silicon oxide powder including the two layers of a noncrystalline SiO$_2$ phase and a crystalline Si phase is obtainable by carrying out, with respect to a raw-material powder including a noncrystalline silicon monoxide powder, a heat treatment at from 800 to 1,200° C. for from one to five hours in an inert atmosphere, such as in a vacuum or in an inert gas.

When milling a raw-material powder, a part of the milling's mechanical energy contributes to chemical atom diffusions at the solid-phase interface in the raw-material powder, thereby generating an oxide phase and a silicon phase. In the milling, the raw-material powder can be mixed with use of a type-"V" mixer, ball mill, attritor, jet mill, vibration mill or high-energy ball mill, and the like, in an inert-gas atmosphere, such as in a vacuum or in an argon gas. The disproportionation of silicon monoxide can also be further facilitated by further subjecting the raw-material powder to a heat treatment after the milling.

The negative-electrode active-material particles constitute a negative-electrode material. The negative-electrode material is coated onto a current collector's surface to form a negative-electrode active-material layer thereon. After making up a negative-electrode material using the above-mentioned negative-electrode active-material particles as the major negative-electrode active material, the other negative-electrode active materials (for example, graphite, Sn, Si, and so on), which have been publicly known already, can even be further added to the resulting negative-electrode material to use.

Besides said negative-electrode active-material particles, a binding agent, a conductive additive, and so on, can also be further included in the negative-electrode material.

Since the binding agent shall not be limited especially at all, binding agents, which have been publicly known already, can be used therefor. For example, it is possible to use resins like fluorine-containing resins, such as polytetrafluoroethylene and polyvinylidene fluoride, which do not decompose even at high potentials. It is preferable that a blending proportion of the binding agent can be "Negative-electrode Active Material": "Binding Agent"=from 1:0.05 to 1:0.5 by mass ratio. This is because of the following: the formability of the resulting electrodes declines when the binding agent is too less; whereas the resultant electrodes' energy density declines when the binding agent is too much.

As for the conductive additive, materials, which have been used commonly in the electrodes of lithium-ion secondary batteries, can be used. For example, it is preferable to use conductive carbon materials, such as carbon blacks (or carbonaceous fine particles), like acetylene black and KETJENBLACK, or carbon fibers. In addition to the conductive carbon materials, a conductive additive, such as conductive organic compounds that have been known already, can also be used. A member of the above can be used independently, or two or more members thereof can be admixed to use. It is preferable that a blending proportion of the conductive additive can be "Negative-electrode Active Material": "Conductive Additive"=from 1:0.01 to 1:0.5 by mass ratio. This is because of the following: no efficient conductive paths can be formed when the conductive additive is too less; whereas not only the formability of the resulting electrodes worsens but also the resultant electrodes' energy density declines when the conductive additive is too much.

Lithium-Ion Secondary Battery

The present lithium-ion secondary battery comprises: a negative electrode including a negative-electrode active-material layer that comprises the above-mentioned negative-electrode material; a positive electrode comprising a positive-electrode active material that enables lithium ions to be sorbed therein and desorbed therefrom; and an electrolyte.

It is common that the negative-electrode material is press attached onto a current collector, as the negative-electrode active-material layer, to constitute the negative electrode. For the current collector, meshes made of metals, such as copper and copper alloys, or metallic foils, can be used, for instance.

The positive electrode can comprise: a current collector; and a positive-electrode material including positive-electrode active-material particles that cover a surface of the current collector. The positive-electrode material includes a positive-electrode active material being capable of sorbing and desorbing lithium ions, or can preferably further include a binding agent and/or a conductive additive. Since the conductive additive and binding agent shall not be limited especially at all, they can be conductive additives and binding agents that are employable in lithium-ion secondary batteries.

As for the positive-electrode active material, a metallic composite oxide of lithium and transition metal, such as lithium-manganese composite oxides, lithium-cobalt composite oxides or lithium-nickel composite oxides, is used, for instance. To be concrete, the following can be given: $LiCoO_2$, $LiNi_{1/3}Co_{1/3}Mn_{1/3}O_2$, $Li_2MnO_2$ or S, and the like. Moreover, it is possible to even use sulfur elementary substances, or sulfur-modified compounds, for the positive-electrode active material. However, it is necessary to pre-dope the positive electrode and negative electrode with lithium when both of them do not include any lithium.

The current collector can be those, such as aluminum, nickel and stainless steels, which have been employed commonly in the positive electrodes of lithium-ion secondary batteries. The current collector can have a configuration, such as meshes or metallic foils.

A separator is used, if needed. The separator is one which separates the positive electrode from the negative electrode, and vice versa, and retains nonaqueous electrolytic solutions therein. For the separator, it is possible to use thin microporous films, such as polyethylene or polypropylene.

The electrolyte can be included in a nonaqueous electrolytic solution. The nonaqueous electrolytic solution is a solution in which a fluoride salt (or fluorine salt), one of electrolytes, has been caused to dissolve in an organic solvent. It is preferable that the fluoride salt serving as the electrolyte can be an alkali-metal fluoride salt which is soluble in the organic solvent. As for the alkali-metal fluoride salt, it is allowable to use at least one member that is selected from the group consisting of $LiPF_6$, $LiBF_4$, $LiAsF_6$, $NaPF_6$, $NaBF_4$, and $NaAsF_6$, for instance. It is permissible that the organic solvent in the nonaqueous electrolytic solution can be aprotic organic solvents. For the organic solvent, it is possible to use one or more members that are selected from the group consisting of propylene carbonate (or PC), ethylene carbonate (or EC), dimethyl carbonate (or DMC), diethyl carbonate (or DEC) and ethyl methyl carbonate (or EMC), and the like, for instance.

A lithium-ion secondary battery can be made as follows: the separators are interposed between the positive electrodes and the negative electrodes, thereby making electrode assemblies; connecting intervals to and from the positive-electrode terminals and negative-electrode terminals, which lead to the outside from the resulting positive-electrode current collectors and negative-electrode current collectors, with use of leads for collecting current, and the like; and thereafter impregnating the electrode assemblies with the nonaqueous electrolytic solution.

The lithium-ion secondary battery's configuration is not limited especially at all, so that it is possible to adopt a variety of configurations, such as cylindrical types, stack-layered types, coin types or laminated types.

Vehicle, Etc.

It is allowable for vehicles to have a lithium-ion secondary battery on-board. Driving a motor for traveling with the lithium-ion secondary battery in which the negative-electrode active-material particles possessing the above-mentioned particle-diameter characteristics results in not only enabling the motor to exhibit larger capacities and produce higher outputs but also making it possible to put the motor in use for a longer period of time. Such a vehicle can be vehicles that make use of electric energies resulting from the lithium-ion secondary battery for all or some of the power source, and can be electric vehicles, hybrid vehicles, and so on, for instance. When a vehicle has the lithium-ion secondary battery on-board, it is allowable to connect the lithium-ion secondary battery in a quantity of multiple pieces in series to make an assembled battery.

Other than the vehicles, the lithium-ion secondary battery is likewise applicable to all sorts of products given as follows: household electrical appliances, office instruments or industrial instruments, which are driven with batteries, such as personal computers or portable communication devices, and so on.

(2) Detailed explanations will be made hereinafter on embodiments according to the second mode of the present invention.

A negative-electrode material in an embodiment according to the second mode comprises negative-electrode active-material particles exhibiting a BET specific surface area that is 6 m$^2$/g or less, exhibiting a "$D_{50}$" that is from 4.5 μm or more to 8.0 μm or less, and exhibiting a grain size that falls in a range of from 0.4 μm or more to 30 μm or less. In this instance, it is possible to make the resulting discharge capacities larger. The reasons are believed to be as follows.

The negative-electrode active-material particles' impedance represents the resistances at the negative-electrode active-material particles' inside and at the interface face between the particles. The smaller the negative-electrode active-material particles' particle diameter becomes the smaller the impedance becomes. When a film is formed on an interface between the negative-electrode active-material particles, the thinner the film becomes at the interface between the particles the smaller the resistance of the film becomes on the negative-electrode active-material particles. On the contrary, the smaller the negative-electrode active-material particles' particle diameter is the thicker the film is formed. Thus, it is possible to make the impedance smaller by setting the particle diameter to fall within such a well-balanced range that enables the particle diameter to make the resulting film thinner to such an extent that hardly makes the resistance greater against the diffusion of Li ions into the particles' inside, so that it is believed possible to make the resulting discharge capacities larger.

When the negative-electrode active-material particles' BET specific surface area exceeds 6 m$^2$/g, there might possibly arise such a fear that the resulting discharge-capacity maintenance rate has declined. The "BET specific surface area" is determined by a method in which molecules with a known adsorption occupation area are adsorbed on a surface of particle of interest to find a specific surface area of the particles from an adsorbed amount of the molecules.

It is preferable that the negative-electrode active-material particles' BET specific surface area can be from 2.5 m$^2$/g or more to 5.0 m$^2$/g or less. Furthermore, it is desirable that the BET specific surface area can be from 2.5 m$^2$/g or more to 4.0 m$^2$/g or less, or can be from 2.7 m$^2$/g or more to 3.3 m$^2$/g or less. In these instances, it is possible to give the negative-electrode active-material particles a particle diameter falling within such a well-balanced range that enables the particle diameter to make the resulting film thinner to such an extent that hardly makes the resistance greater against the diffusion of Li ions into the particles' inside, so that the resulting discharge capacities become much larger.

The negative-electrode active-material particles' "$D_{50}$" is from 4.5 μm or more to 8.0 μm or less. The "$D_{50}$" herein designates a particle diameter at which a volumetric-distribution accumulated value is equivalent to 50% in a grain-size distribution measurement by means of laser diffraction method. In other words, the "$D_{50}$" designates a median diameter that is measured on the volumetric basis. When the "$D_{50}$" is less than 4.5 μm, or when it exceeds 8.0 μm, there might possible arise such a fear that the resulting discharge capacities have declined.

In addition, it is preferable that the "$D_{50}$" can be from 5.0 μm or more to 7.2 μm or less, or it is desirable that the "$D_{50}$" can be from 5.7 μm or more to 7.2 μm or less. In these instances, it is possible to set the particle diameter at such particle diameters that are balanced well in order to make the negative-electrode active-material particles' reactive resistance smaller, so that the resulting discharge capacities further upgrade.

The negative-electrode active-material particles' grain-size range is set to fall within a range of from 0.4 μm or more to 30 μm or less. The "grain-size range" herein refers to the negative-electrode active-material particles' particle diameters. "A grain-size range falling in a range of from 0.4 μm or more to 30 μm or less" herein refers to the fact that the negative-electrode active-material particles' particle diameters fall within a range of from 0.4 μm or more to 30 μm or less. When the entire negative-electrode active-material particles are taken as 100% by volume, it is allowable that a proportion of the negative-electrode active-material particles, which possess particle diameters falling within the aforementioned grain-size range, can account for 95% by volume or more among them all. The "particle diameter" shall be an effective diameter that is calculated by comparing an actually-measured diffraction pattern with a theoretical diffraction pattern that is obtainable by means of laser diffraction/scatter method assuming that particles of interest are spheres. When the negative-electrode active-material particles whose particle diameter is less than 0.4 μm are included, there might possibly arise such a fear that the resulting discharge capacities have declined, because fine particles come to be present more in the negative-electrode active-material particles so that a film, which generates at the time of charging, has become thicker. When the negative-electrode active-material particles, whose particle diameters become so large excessively to exceed 30 μm, are included, there might possibly arise such a fear that the resultant first-round discharge capacity has declined, because the negative-electrode active-material particles' resistance against diffusion becomes larger.

It is preferable that the negative-electrode active-material particles' grain-size range can be from 0.5 μm or more to 30 μm or less. Furthermore, it is desirable that the grain-size range can be from 1.0 μm or more to 20 μm or less, or from 1.0 μm or more to 18.5 μm or less, or from 1.37 μm or more to 18.5 μm or less. In these instances, the resulting discharge capacities further upgrade.

It is preferable that the negative-electrode active-material particles exhibit a "$D_{10}$" that is 3.0 μm or more. In this instance, the resulting discharger capacities become much larger. The reason is as follows: fine particles come to be present much less in the negative-electrode active-material particles because of the fact that the negative-electrode active-material particles' "$D_{10}$" is 3.0 μm or more. Consequently, it is believed that the resultant discharge capacities become greater, because a film formed on a surface of the negative-electrode active-material particles becomes thin relatively so that the particles exhibit lowered film resistance. The "$D_{10}$" herein designates a particle diameter at which a volumetric-distribution accumulated value is equivalent to 10% in a grain-size distribution measurement by laser diffraction method.

In addition, it is allowable that the negative-electrode active-material particles' "$D_{10}$" can be 3.4 μm or more. Furthermore, it is preferable that the "$D_{10}$" can be 4.0 μm or more. In these instances, the resulting discharge capacities further upgrade.

It is allowable that the negative-electrode active-material particles' "$D_{10}$" can be 6.0 μm or less. Furthermore, it is preferable that the "$D_{10}$" can be 5.5 μm or less. When the negative-electrode active-material particles' "$D_{10}$" is too large, there might possibly arise such a fear that the negative-electrode active-material particles' reactive resistance (or the resistance against Li ions that diffuse into the inside of negative-electrode active material) has augmented.

It is allowable that the negative-electrode active-material particles can exhibit a "$D_{90}$" that is so large to exceed 8.0 μm, or it is preferable that the "$D_{90}$" can be 10.0 μm or less. In these instances, the resulting first-round discharge capacity becomes much larger. The reason is believed to be as follows: a film formed on a surface of the negative-electrode active-material particles becomes thin relatively, and thereby the particles exhibit suppressed film resistance, and thereby it is possible to make the resultant negative electrodes' reactive resistance lower because the particles' particle diameters are also small relatively. As a result, it shall be thus possible to make the resulting discharge capacities larger.

Note that the "$D_{90}$" herein designates a particle diameter at which a volumetric-distribution accumulated value is equivalent to 90% in a grain-size distribution measurement by means of laser diffraction method.

In addition, it is allowable that the negative-electrode active-material particles' "$D_{90}$" can be from 8.5 μm or more to 11 μm or less. Furthermore, it is preferable that the "$D_{90}$" can be from 8.8 μm or more to 10.0 μm or less. In these instances, the resulting discharge capacities become much larger.

It is preferable that the negative-electrode active-material particles can include particles, which possess a particle diameter of 1 μm or more, in an amount of 85% by volume or more of them when the entirety is taken as 100% by mass. The "particle diameter" shall be an effective diameter that is calculated by comparing an actually-measured diffraction pattern with a theoretical diffraction pattern that is obtainable by means of laser diffraction/scatter method assuming that particles of interest are spheres.

In a case where the negative-electrode active-material particles include particles, which possess a particle diameter of 1 μm or more, in an amount of less than 85% by volume when the entire negative-electrode active-material particles are taken as 100% by volume, the BET specific surface area of the entire negative-electrode active-material particles becomes larger, so that the film thickness of a film, which is formed at the time of charging, becomes larger. The film whose film thickness is larger makes the negative-electrode active-material particles exhibit larger film resistance. Consequently, there might possibly arise such a fear that the resulting discharge capacities have declined. It is preferable that the negative-electrode active-material particles can include particles, which possess a particle diameter of 1 μm or more, in an amount of 95% by volume or more of them when the entirety is taken as 100% by volume.

In addition, it is preferable that the negative-electrode active-material particles can include particles, which possess a particle diameter falling in a range of from 1 μm or more to 4 μm or less, in an amount of 95% by volume or more of them when the entirety is taken as 100% by volume. In this instance, the resistance of the particles against diffusion, and the resistance of a film at the interface between the particles are suppressed in a well-balanced manner, so that it is possible to keep down the resulting batteries' resistance.

In the second mode as well, a film can also be formed on a surface of the negative-electrode active-material particles in the same manner as the first mode. Moreover, in order to adjust the negative-electrode active-material particles' grain size, it is allowable to carry out a cyclone classification using a centrifugal machine, a dry-type classification, a wet-type classification, a sieving classification, and so on. It is permissible that the other elements or features (such as the negative-electrode active-material particles' components, a production process for the same, the negative-electrode material's constitution, and the lithium-ion secondary battery's constitution) can be the same as those according to the first mode.

(3) Detailed explanations will be made hereinafter on embodiments according to the third mode of the present invention.

In a negative electrode for lithium-ion secondary battery according to the third mode of the present invention, the negative-electrode active-material particles include particles whose particle diameter is 1 μm or more in an amount of 85% by volume or more of them when the entirety is taken as 100% by volume, and the negative-electrode active-material layer has a thickness that is 1.4 times or more of a "$D_{90}$" that the negative-electrode active-material particles exhibit. Consequently, it is possible to cause the resulting batteries' characteristics to upgrade, and to cause them to stabilize. The reason is believed to be as follows.

When a charging/discharging operation is carried out for a lithium-ion secondary battery, the insertion and elimination of Li ions are carried out between the positive-electrode active material and the negative-electrode active material through the electrolytic solution. On that occasion, the electrolyte included within the electrolytic solution is reduced partially to be decomposed, so that the resulting decomposed products cover a surface of the negative-electrode active-material particles to form a film. The film is a membrane that let Li ions pass through it but not electrons, and is referred to as a solid electrolyte interphase (or SEI) film. Covering the negative-electrode active-material particles' surface with the film leads to preventing the electrolyte from directly contacting with the negative-electrode active material to suppress the electrolyte from decomposing to deteriorate.

When the negative-electrode active-material particles are fine particles whose particle diameter is less than 1 μm, the film thickness of a film, which is formed on a surface of the negative-electrode active-material particles, tends to become larger. When the film's thickness is larger, it is not possible for the film to follow the volumetric changes of Si or Sn resulting from charging/discharging reactions, and thereby stresses concentrate in the film's surface, so that cracks or defects are likely to arise therein. When damages thus arise in the film, the negative-electrode active-material particles' inside becomes likely to be impregnated with the electrolytic solution through the film's damaged parts, and thereby the electrolytic solution's components become likely to be decomposed because of the fact that the electrolytic solution contacts with the negative-electrode active material, so that the resulting charging/discharging cyclability has come to decline. Moreover, when the negative-electrode active-material particles are the fine particles, since the negative-electrode active-material particles' BET specific surface area augments, a film, which is formed on the surface, increases, and thereby the resultant film becomes resistance against Li ions that come in and go out, so that there might possibly arise such a fear that the resulting discharge capacities have declined.

In the present invention, the negative-electrode active-material particles include particles, whose particle diameter is 1 μm or more, in an amount of 85% by volume or more of them when the entirety is taken as 100% by volume. Consequently, the fine particles whose particle diameter is less than 1 μm come to be present extremely less in the negative-electrode active-material particles. Since an amount of the fine particles included in the negative-electrode active-material particles is thus suppressed, the negative-electrode active-material particles, which have been covered with a heavy-thickness film being likely to be damaged, come to be present extremely less, and thereby it is possible to suppress the electrolytic solution from deteriorating, so that it is possible to cause the resulting cyclability to upgrade. Moreover, when the negative-electrode active-material particles' particle diameter becomes larger, since the negative-electrode active-material particles' specific surface area becomes smaller, an amount of the film formed on the negative-electrode active-material particles' surface becomes less, and thereby the resistance, which the negative-electrode active-material particles exert, reduces, so that the resultant discharge capacities augment.

Figure 6:
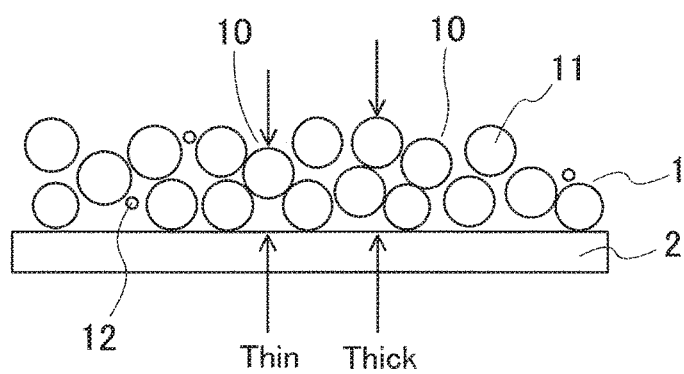
FIG. 6 is an explanatory diagram of across section in a negative electrode for lithium-ion secondary battery according the present invention.

As illustrated in FIG. 6, a negative electrode is provided with a negative-electrode active-material layer 1, which comprises negative-electrode active-material particles, on the surface of a current collector 2. In a case where particles having a particle diameter of 1 μm or more are present in an amount of 85% by volume or more among the entire negative-electrode active-material particles within the negative-electrode active-material layer 1, a proportion of the negative-electrode active-material particles whose particle diameter is 1 μm or more becomes more among the entire negative-electrode active-material particles, and thereby dents and projections are formed between relatively large particles 11 in the negative-electrode active-material particles that exist in the surface of the negative-electrode active-material layer 1, so that dented portions 10 of the dents and projections cannot be filled up with fine particles in the negative-electrode active-material particles, and thereby the resulting surface roughness of the negative-electrode active-material layer 1 becomes larger. At thinner parts in the negative-electrode active-material layer 1, electrolytic solutions are likely to infiltrate down even into the inside. In this instance, when cracks have occurred in a film formed on the negative-electrode active-material particles' surface, negative-electrode active materials constituting the negative-electrode active-material particles are likely to contact with the electrolytic solutions, so that the resultant cyclability is likely to decline. On the other hand, at the thicker parts in the negative-electrode active-material layer 1, the electrolytes are less likely to infiltrate down even into the inside. Consequently, even when cracks have arisen in the film, the electrolytic solutions and the negative-electrode active materials are less likely to contact with each other compared with those at the thinner parts, so that the resulting cyclability is less likely to decline. Moreover, the capacity becomes smaller at the thinner parts in the negative-electrode active-material layer, whereas the capacity becomes larger at the thicker parts. On this account, fluctuations are likely to arise in the resultant batteries' characteristics, such as the cyclability and the discharge capacities.

Hence, in the present invention, the negative-electrode active-material layer's thickness is set at 1.4 times or more of the negative-electrode active-material particles' "$D_{90}$." In this instance, at many parts in the negative-electrode active-material layer, the negative-electrode active-material particles come to be placed in an amount of 1.4 pieces or more in the thickness-wise direction of the negative-electrode active-material layer, and thereby the negative-electrode active-material layer's thickness fluctuates less, so that the resulting charging/discharging cyclability stabilizes. Moreover, the resultant discharge capacities come to fluctuate less as well. Accordingly, it is possible to cause the resultant batteries' characteristics, such as the cyclability and the discharge capacities, to stabilize.

That is, it is possible to cause the resulting batteries' characteristics to upgrade and stabilize, because the negative-electrode active-material particles exhibit the above-mentioned particle-diameter characteristic, and because the negative-electrode active-material layer's thickness exhibits the above-mentioned relationship with the negative-electrode active-material particles' particle-diameter characteristic.

On the other hand, when the negative-electrode active-material layer's thickness is less than 1.4 times of the negative-electrode active-material particles' "$D_{90}$," the negative-electrode active-material layer's thickness fluctuates greatly, so that fluctuations become likely to occur in the resulting batteries' characteristics.

In addition, it is preferable that the negative-electrode active-material layer's thickness can be two times or more of the negative-electrode active-material particles' "$D_{90}$." In this instance, the negative-electrode active-material layer's thickness fluctuates much less, so that the resulting batteries' characteristics can be stabilized more.

It is preferable that the negative-electrode active-material layer's thickness can be five times or less of the negative-electrode active-material particles' "$D_{90}$." In this instance, electrolytic solutions infiltrate fully down to the negative-electrode active-material layer's inside. Moreover, the diffusion of Li ions into the negative-electrode active-material layer's inside is faster as well, so that the resulting discharge capacities and rate characteristic are good.

Here, it is preferable that the negative-electrode active-material layer's thickness can be three times or more of the negative-electrode active-material particles' "$D_{10}$." In this instance, the negative-electrode active-material particles' fine particles 12, whose relative size is smaller with respect to the negative-electrode active-material layer's thickness, come to be present more among the entire negative-electrode active-material particles, and thereby more of the fine particles 12 come into the dented portions 10 in the surface of the negative-electrode active-material layer 1, so that it is possible to flatten the surface. Consequently, it is possible to cause the resulting batteries' characteristics to further stabilize.

In addition, it is desirable that the negative-electrode active-material layer's thickness can be four times or more of the negative-electrode active-material particles' "$D_{10}$." In this instance, it is possible to further flatten the negative-electrode active-material layer's surface, so that it is possible to cause the resulting batteries' characteristics to further stabilize.

It is preferable that the negative-electrode active-material layer's thickness can be ten times or less of the negative-electrode active-material particles' "$D_{10}$." In this instance, electrolytic solutions infiltrate fully down to the negative-electrode active-material layer's inside. Moreover, the diffusion of Li ions into the negative-electrode active-material layer's inside is faster as well, so that the resulting discharge capacities and rate characteristic are good.

It is desirable that the negative-electrode active-material layer's thickness can be two times or more of the negative-electrode active-material particles' "$D_{50}$," or can furthermore be 2.5 times or more of the "$D_{50}$." When the negative-electrode active-material layer's thickness is two times or more of the negative-electrode active-material particles' "$D_{50}$," the negative-electrode active-material layer's thickness becomes a sufficient size with respect to the negative-electrode active-material particles' "$D_{50}$," and thereby the negative-electrode active-material layer's thickness fluctuates less, so that it is possible to cause the resulting batteries' characteristics to further stabilize.

It is preferable that the negative-electrode active-material layer's thickness can be seven times or less of the negative-electrode active-material particles' "$D_{50}$." In this instance, electrolytic solutions infiltrate fully down to the negative-electrode active-material layer's inside. Moreover, the diffusion of Li ions into the negative-electrode active-material layer's inside is faster as well, so that the resulting discharge capacities and rate characteristic are good.

When the negative-electrode active-material layer's thickness is too small, there might possibly arise such a fear that the stability of the resulting charging/discharging cyclability has become lower. When the negative-electrode active-material layer's thickness is too large, electrolytic solutions are less likely to infiltrate down to the inside, and thereby the electrolytic solutions are less likely to contact with negative-electrode active materials, so that there might possibly arise such a fear that the resultant charging/discharging characteristics have declined.

Moreover, in a case where particles whose particle diameter is 1 μm or more are present in an amount of less than 85% by volume when the entirety of the negative-electrode active-material particles within the negative-electrode active-material layer is taken as 100% by volume, fine particles whose particle diameter is less than 1 μm come to be included more relatively within the negative-electrode active-material particles. Consequently, the negative-electrode active-material particles' specific surface area becomes larger, so that a film is generated more thereon. Accordingly, the negative-electrode active-material particles come to exhibit higher resistance, so that there might possibly arise such a fear the resulting charging/discharging characteristics have degraded.

It is allowable that the negative-electrode active-material particles within the negative-electrode active-material layer can include particles, which possess a particle diameter of 1 μm or more, in an amount of 95% by volume or more of them when the entirety is taken as 100% by volume. In this instance, fine particles whose particle diameter is less than 1 μm come to be present in a much smaller amount within the negative-electrode active-material particles, so that an amount of the film becomes less. Accordingly, the negative-electrode active-material particles' resistance is suppressed low, so that the resulting charging/discharging characteristics upgrade.

In addition, it is preferable that the entirety of the negative-electrode active-material particles within the negative-electrode active-material layer can be particles whose particle diameter is 1 μm or more. In this instance, fine particles whose particle diameter is less than 1 μm come not to exist among the negative-electrode active-material particles within the negative-electrode active-material layer, and thereby an amount of the film reduces, so that it is possible to suppress the negative-electrode active-material particles' resistance lower.

It is preferable that the negative-electrode active-material particles can include particles, whose particle diameter is 2.0 μm or more, in an amount of 85% by volume or more of them when the entirety of said negative-electrode active-material particles within the negative-electrode active-material layer is taken as 100% by volume. In this instance, it is possible to keep less relatively-small particles whose particle diameter is less than 2.0 μm, so that it is possible to make the negative-electrode active-material particles' particle diameters much larger. Accordingly, it is possible to make an amount of the film much less on the negative-electrode active-material particles' surface, so that it is possible to make the negative-electrode active-material particles' resistance much lower. In addition, it is preferable that the negative-electrode active-material particles can include particles, whose particle diameter is 2.0 μm or more, in an amount of 95% by volume or more of them when the entirety of said negative-electrode active-material particles within the negative-electrode active-material layer is taken as 100% by volume. If so, it is possible to more effectively suppress electrolytic solutions from deteriorating.

It is preferable that the negative-electrode active-material particles can include particles, whose particle diameter is 30 μm or less, in an amount of 85% by volume or more of them when the entirety of the negative-electrode active-material particles within the negative-electrode active-material layer is taken as 100% by volume. When larger particles whose particle diameter exceeds 30 μm come to be present more, the negative-electrode active-material particles' internal resistance becomes larger because the negative-electrode active material including Si exhibits higher resistance against conduction, so that there might possibly arise such a fear that the resulting batteries' capacities have declined. In addition, it is preferable that the negative-electrode active-material particles can include particles, whose particle diameter is 30 μm or less, in an amount of 95% by volume or more of them when the entirety of the negative-electrode active-material particles within the negative-electrode active-material layer is taken as 100% by volume. In this instance, it is possible to enhance the resultant batteries' capacities.

It is allowable that the negative-electrode active-material particles' "$D_{50}$" can be 5.5 μm or more. Furthermore, it is preferable that the "$D_{50}$" can be 5.7 μm or more. In these instance, the resulting batteries' cyclability further upgrades.

It is allowable that the negative-electrode active-material particles' "$D_{50}$" can be 8.0 μm or less. Furthermore, it is preferable that the "$D_{50}$" can be 7.5 μm or less. When the negative-electrode active-material particles' "$D_{50}$" is too large, there might possibly arise such a fear that the reactive resistance of the negative-electrode active-material particles (or the resistance against Li ions that diffuse into the inside of negative-electrode active material) has augmented.

It is allowable that the negative-electrode active-material particles' "$D_{10}$" can be 3.0 μm or more; furthermore, it is preferable that the "$D_{10}$" can be 3.4 μm or more, or can be 4.0 μm or more. In these instances, smaller particles whose particle diameter is less than 3.0 μm come to be present less among the negative-electrode active-material particles, so that it is possible to suppress the decompositions of electrolytic solutions that result from damaged films.

It is allowable that the negative-electrode active-material particles' "$D_{10}$" can be 6.0 μm or less. Furthermore, it is preferable that the "$D_{10}$" can be 5.5 μm or less. When the negative-electrode active-material particles' "$D_{10}$" is too large, there might possibly arise such a fear that the reactive resistance of the negative-electrode active-material particles (or the resistance against Li ions that diffuse into the inside of negative-electrode active material) has augmented.

It is allowable that the negative-electrode active-material particles' "$D_{90}$" can be so large to exceed 7.5 μm. Furthermore, it is preferable that the "$D_{90}$" can be 8.5 μm or more, or can be 9.0 μm or more. In these instances, a proportion of the negative-electrode active-material particles whose particle diameter is larger increases, so that an amount of the film becomes less. Consequently, the negative-electrode active-material particles' resistance is reduced, so that the resulting charging/discharging cyclability further upgrades.

It is allowable that an upper limit of the negative-electrode active-material particles' "$D_{90}$" can be 12 µm or less. Furthermore, it is preferable that the upper limit can be 10.5 µm or less. When the negative-electrode active-material particles' "$D_{90}$" is too large, there might possibly arise such a fear that the reactive resistance of the negative-electrode active-material particles (or the resistance against Li ions that diffuse into the inside of negative-electrode active material) has augmented.

It is preferable that a ratio of the negative-electrode active-material particles' "$D_{50}$" with respect to the negative-electrode active-material particles' "$D_{90}$" can be from 0.5 or more to 0.8 or less, or the ratio can furthermore be from 0.65 or more to 0.8 or less. When the ratio of the negative-electrode active-material particles' "$D_{50}$" with respect to the negative-electrode active-material particles' "$D_{90}$" is less than 0.5, there might possibly arise such a fear that the decomposed products of electrolytic solutions have augmented; whereas, when the ratio exceeds 0.8, fluctuations are likely to arise in the negative-electrode active-material layer's thickness, so that there might possibly arise such a fear that the stability of the resulting batteries' characteristics has declined.

It is preferable that a ratio of the negative-electrode active-material particles' "$D_{10}$" with respect to the negative-electrode active-material particles' "$D_{90}$" can be from 0.1 or more to 0.6 or less, or the ratio can furthermore be from 0.4 or more to 0.6 or less. When the ratio of the negative-electrode active-material particles' "$D_{10}$" with respect to the negative-electrode active-material particles' "$D_{90}$" is less than 0.1, there might possibly arise such a fear that the decomposed products of electrolytic solutions have augmented; whereas, when the ratio exceeds 0.6, fluctuations are likely to arise in the negative-electrode active-material layer's thickness, so that there might possibly arise such a fear that the stability of the resulting batteries' characteristics has declined.

Here, the "$D_{50}$" is referred to as a particle diameter at which a volumetric-distribution accumulated value is equivalent to 50% in a grain-size distribution measurement by means of laser diffraction method, and can also be called a median diameter. The "$D_{10}$" is referred to as a 10%-diameter value in a volume-basis accumulated fraction when finding the integrated volume starting at smaller grain-size-distribution particles. Likewise, the "$D_{90}$" is referred to as a 90%-diameter value in a volume-basis accumulated fraction when finding the integrated volume starting at smaller grain-size-distribution particles. All of the "$D_{50}$," "$D_{10}$" and "$D_{90}$" are measured by a grain-size-distribution measuring apparatus.

It is preferable that the negative-electrode active-material particles' grain-size range can be set to fall within a range of from 0.4 µm or more to 30 µm or less. The "grain-size range" herein refers to a range of particle diameters of the negative-electrode active-material particles that are included in the negative electrode. When the entire negative-electrode active-material particles are taken as 100% by volume, it is allowable that a proportion of the negative-electrode active-material particles, which possess particle diameters falling within the aforementioned grain-size range, can account for 95% by volume or more among the mall. The "particle diameter" shall be an effective diameter that is calculated by comparing an actually-measured diffraction pattern with a theoretical diffraction pattern that is obtainable by means of laser diffraction/scatter method assuming that particles of interest are spheres.

When being less than 0.4 µm is included in the negative-electrode active-material particles' grain-size range, there might possibly arise such a fear that the resulting charging/discharge cyclability has declined, because fine particles come to be present more in the negative-electrode active-material particles so that a film, which generates at the time of charging, has become more to augment the films' resistance. When a range exceeding 30 µm is included in the negative-electrode active-material particles' grain-size range, there might possibly arise such a fear that the resultant capacities have declined, because the resistance against Li ions, which diffuse into the negative-electrode active-material particles' inside, becomes larger. Moreover, inside the negative-electrode active-material particles, parts that can contribute to battery reactions, and the other parts that cannot contribute to them have arisen, so that the extents of expansion and contraction have come to differ within the particles at the time of battery reactions, and thereby cracks have arisen within the particles, so that there might possibly arise such a fear that the resulting cyclability has declined.

It is preferable that the negative-electrode active-material particles' grain-size range can be from 0.5 µm or more to 30 µm or less, or it is desirable that the grain-size range can be from 1.0 µm or more to 20 µm or less, or can be from 1.37 µm or more to 18.5 µm or less. In these instances, the resulting cyclability further upgrades.

The negative-electrode active-material particles can exhibit a BET specific surface area of 6 $m^2/g$ or less. Furthermore, it is preferable that the BET specific surface area can be 5 $m^2/g$ or less, 4 $m^2/g$ or less, or 3.3 $m^2/g$ or less. In these instances, the resulting cyclability at the time of charging and discharging further upgrades. The "BET specific surface area" is determined by a method in which molecules with a known adsorption occupation area are adsorbed on a surface of particles of interest to find a specific surface area of the particles from an adsorbed amount of the molecules, and is measured by an apparatus for measuring absorption and desorption.

It is allowable that the negative-electrode active-material particles' BET specific surface area can be 2 $m^2/g$ or more. Furthermore, it is preferable that the BET specific surface area can be 2.5 $m^2/g$ or more. In these instances, it is possible to make a mutual contact area between the negative-electrode active-material particles larger, and thereby it is possible to make more conductive paths for electrons, so that it is possible to demonstrate a larger first-round discharge capacity.

The above-mentioned negative-electrode active-material particles constitute a negative-electrode active-material layer covering at least a surface of a current collector.

It is preferable that a volumetric ratio of said negative-electrode active-material particles can be from 20% or more to 90% or less when the whole volume of the negative-electrode active-material layer is taken as 100% by volume. In a case where the volumetric ratio of the negative-electrode active-material particles is less than 20%, there might possibly arise such a fear that fluctuations have arisen in the resulting batteries' characteristics, not only because the resultant discharge capacities decline, but also because the negative-electrode active-material particles are likely to exist lopsidedly depending parts in the negative-electrode active-material layer. On the other hand, in another case where the volumetric ratio of the negative-electrode active-material particles exceeds 90%, the negative-electrode active-material particles become too dense within the negative-electrode active-material layer, and thereby conductive paths for Li ions become less, so that there might possibly arise such a fear that the resulting conductivity has declined.

In the third mode, a film can also be formed on a surface of the negative-electrode active-material particles in the same manner as the first mode. Moreover, in order to adjust the negative-electrode active-material particles' grain size, it is allowable to carry out a cyclone classification using a centrifugal machine, a dry-type classification, a wet-type classification, a sieving classification, and so on. The components of the negative-electrode active-material particles, and the production process for the negative-electrode active-material particles are the same as those according to the first mode.

In the third mode, the negative-electrode active-material layer comprises the negative-electrode active-material particles that possess the above-mentioned features. It is allowable that the other elements or features of the negative-electrode active-material particles (the components, the production process, and so on) can be the same as those according to the first and second modes. It is even permissible that, besides the negative-electrode active-material particles, the negative-electrode active-material layer can further include a binding agent, a conductive additive, and so forth, in the same manner as the negative-electrode material according to the first mode.

The negative electrode comprises a current collector, and the negative-electrode active-material layer formed on a surface of the current collector. As for a process for forming the negative-electrode active-material layer on the current collector's surface, the following can be given, for instance: a method of forming a film from a slurry, which includes the negative-electrode active-material particles, on a surface of the current collector with use of a doctor blade; a sheeting method of turning a slurry, which includes the negative-electrode active-material particles, into a sheet, and then placing the sheet on the current collector's surface, and the like. Moreover, the negative-electrode active-material layer can be caused to press attach onto the current collector's surface. As for the press-attaching method, although a roll-pressing method, and so forth, can be given, the roll-pressing method is allowable in order to flatten the surface. It is permissible for the current collector to use the current collector for use in the negative electrode in the first mode.

The present lithium-ion secondary battery comprises the above-mentioned negative electrode, and simultaneously it is constituted of a positive electrode and an electrolyte. It is allowable for the positive electrode to use the same positive electrode as that being described in the first mode. It is permissible for a separator, too, to be used, if needed, in the same manner as the first mode.

It is allowable for the electrolyte to be included in a nonaqueous electrolytic solution. The nonaqueous electrolytic solution is a solution in which an electrolyte has been caused to dissolve in an organic solvent. It is permissible for the electrolyte to be a fluoride salt (or fluorine salt), and it is preferable that the electrolyte can be an alkali-metal fluoride salt which is soluble in the organic solvent. As for the alkali-metal fluoride salt, it is allowable to use at least one member that is selected from the group consisting of $LiPF_6$, $LiBF_4$, $LiAsF_6$, $NaPF_6$, $NaBF_4$, and $NaAsF_6$, for instance.

It is allowable for the organic solvent in the nonaqueous electrolytic solution to be an aprotic organic solvent, and it is permissible to use a ring-shaped carbonate or chain-shaped molecule, and so on, for instance. It is preferable that the solvent in the electrolytic solution can include both of the ring-shaped carbonate and chain-shaped molecule. Since the ring-shaped carbonate has a higher dielectric constant, and since the chain-shaped molecule has a lower viscosity, they do not interfere with the movements of Li ions, so that it is possible to cause the resulting batteries' capacities to upgrade.

When the solvents as a whole in the electrolytic solution are taken as 100% by volume, the ring-shaped carbonate can account for from 30 to 50% by volume or less, and said chain-shaped molecule can account for from 50 to 70% by volume. Whereas the ring-shaped carbonate enhances the electrolytic solution's dielectric constant, it has a higher viscosity. When the dielectric constant goes up, the electrolytic solution's conductivity becomes better. When the viscosity is high, the movements of Li ions are interfered to make the conductivity worse. Although the chain-shaped molecule has a lower dielectric constant, it has a lower viscosity. Blending both of them in a well-balanced manner in a range of the above-mentioned blending ratio leads to making the resulting solvent's dielectric constant higher to a certain extent, or moreover to also making its viscosity lower, and thereby it is possible to prepare solvents with better conductivity, so that it is possible to cause the resultant batteries' capacities to upgrade.

The ring-shaped carbonate can also include at least one member that is selected from the group consisting of fluorinated ethylene carbonate, propylene carbonate (or PC), and ethylene carbonate (or EC). This results from the fact that fluorinated ethylene carbonate makes a film, which is formed on the negative-electrode active-material particles' surface, more stable and firmer, because it is a ring-shaped carbonate possessing at least one fluorine group within the molecule, and because the fluorine group becomes one of the film's constituent elements. As for the fluorinated ethylene carbonate, it is preferable to use fluoroethylene carbonate (or FEC), or difluoroethylene carbonate, and the like.

It is preferable that the fluorinated ethylene carbonate can account for from 1% by volume or more to 30% by volume or less when the solvents as a whole in the electrolytic solution are taken as 100% by volume. In this instance, it is possible to cause the resulting charging/discharging cyclability to upgrade effectively, and simultaneously it is possible to cause the resultant batteries' capacities to upgrade more because the electrolytic solution's viscosity is also suppressed lower to make Li ions likely to move around.

The chain-shaped molecule used in the organic solvent is not limited especially at all, as far as it has a chain shape. For example, it is possible to use one or more members that are selected from dimethyl carbonate (or DMC), diethyl carbonate (or DEC), ethyl methyl carbonate (or EMC), and so on.

In the third mode, features other than the above-mentioned features can be the same as those according to the first mode.

(4) Detailed explanations will be made hereinafter on embodiments according to the fourth mode of the present invention.

In the lithium-ion secondary batteries according to the present invention, the negative-electrode active-material particles include particles whose particle diameter is 1 µm or more in an amount of 85% by volume or more of them when the entirety of the negative-electrode active-material particles included in the negative electrode is taken as 100% by volume, and the solvent in the electrolytic solution comprises fluorinated ethylene carbonate. Consequently, the present lithium-ion secondary batteries excel in the battery characteristics, especially, in the charging/discharging cyclability, as shown in later-described specific examples. The reasons have not been definite yet, but are believed to be as follows.

When a charging/discharging operation is carried out for a lithium-ion secondary battery, the insertion and elimination of Li ions are carried out between the positive-electrode active material and the negative-electrode active material through the electrolytic solution. On that occasion, the electrolyte included within the electrolytic solution is reduced partially to be decomposed, so that the resulting decomposed products cover a surface of the negative-electrode active-material particles to form a film. The film is a membrane that let Li ions pass through it but not electrons, and is referred to as a solid electrolyte interphase (or SEI) film. Covering the negative-electrode active-material particles' surface with the film leads to preventing the electrolyte from directly contacting with the negative-electrode active material to suppress the electrolyte from decomposing to deteriorate.

When the negative-electrode active-material particles are fine particles whose particle diameter is 1 μm or less, the film thickness of a film, which is formed on a surface of the negative-electrode active-material particles, tends to become larger. When the film's thickness is larger, it is not possible for the film to follow the volumetric changes of Si resulting from charging/discharging reactions, and thereby stresses concentrate in the film's surface, so that cracks or defects are likely to arise therein. When damages thus arise in the film, the negative-electrode active-material particles' inside becomes likely to be impregnated with the electrolytic solution through the film's damaged parts, and thereby the electrolytic solution's components become likely to be decomposed because of the fact that the electrolytic solution contacts with the negative-electrode active material, so that the resulting charging/discharging cyclability has come to decline. Moreover, when the negative-electrode active-material particles are the fine particles, the film formed on the surface becomes denser and compacter because active sites for cracks or defects, and so on, are made more in the negative-electrode active-material particles by pulverizing them, and so forth, so that the resulting film becomes resistance to Li ions that come in and go out.

In the present invention, the negative-electrode active-material particles include particles, whose particle diameter is 1 μm or more, in an amount of 85% by volume or more of them when the entirety is taken as 100% by volume. Consequently, the fine particles whose particle diameter is less than 1 μm come to be present extremely less in the negative-electrode active-material particles. Since an amount of the fine particles included in the negative-electrode active-material particles is thus suppressed, the negative-electrode active-material particles, which have been covered with a heavy-thickness film being likely to be damaged, come to be present extremely less, and thereby it is possible to suppress the electrolytic solution from deteriorating, so that it is possible to cause the resulting cyclability to upgrade. Moreover, when the negative-electrode active-material particles' particle diameter becomes larger, the film formed on the surface comes to have a coarser structure because reactions occur uniformly on the negative-electrode active-material particles' surface, so that it is possible for Li ions to pass through the film smoothly.

Moreover, the electrolytic solution comprises fluorinated ethylene carbonate. Many of the fluorine atoms being introduced into the fluorinated ethylene carbonate becomes one of the constituent components of LiF within the SEI film. Consequently, including fluorinated ethylene carbonate in the electronic solution results in generating a stable and firm SEI film, and thereby negative-electrode active materials are inhibited from contacting directly with the electrolytic solution, so that it is possible to suppress the electrolytic solution from decomposing.

On account of the above, in accordance with the present invention, a stable and firm SEI film is formed in a thinner thickness on the negative-electrode active-material particles' surface, because the negative-electrode active-material particles include particles whose particle diameter is 1 μm or less in an extremely less amount, and because the electrolytic solution includes fluorinated ethylene carbonate. Accordingly, the negative-electrode active-material particles, which have been covered with a heavy-thickness film that is likely to be damaged, come to be present extremely less, and thereby it is possible to suppress the electrolytic solution from deteriorating, so that it is possible to cause the resulting cyclability to upgrade.

On the contrary, in a case where particles whose particle diameter is 1 μm or more are present in an amount of less than 85% by volume when the entirety of the negative-electrode active-material particles is taken as 100% by volume, fine particles whose particle diameter is less than 1 μm come to be included more relatively within the negative-electrode active-material particles. Consequently, the negative-electrode active-material particles, in which damages arise in the SEI film at the time of charging and discharging, come to be present more, and thereby the electrolytic solution contacts directly with negative-electrode active materials to develop deteriorations of the electrolytic solution, so that there might possibly arise such a fear the resulting charging/discharging characteristics have declined.

Here, it is preferable that the negative-electrode active-material particles can include particles whose particle diameter is 1 μm or more in an amount of 95% by volume or more of them when the entirety is taken as 100% by volume. In this instance, deteriorations of the electrolytic solution are further suppressed so that the resulting cyclability further upgrades. Moreover, resistance against Li ions, which pass through a film formed on the negative-electrode active-material particles' surface, further declines.

It is preferable that the entirety of the negative-electrode active-material particles included in the negative electrode can be particles whose particle diameter is 1 μm or more. In this instance, fine particles whose particle diameter is less than 1 μm come not to exist among the negative-electrode active-material particles included in the negative electrode, and thereby it is possible to effectively suppress the resulting SEI film from being damaged, so that it is possible to effectively suppress the electrolytic solution from deteriorating.

When the entirety of said negative-electrode active-material particles included in said negative electrode is taken as 100% by volume, the negative-electrode active-material particles can preferably include particles, whose particle diameter is 1.5 μm or more, in an amount of 85% by volume or more of them. Furthermore, they can desirably include particles, whose particle diameter is 1.5 μm or more, in an amount of 95% by volume or more. In these instances, it is possible to keep less relatively-small particles whose particle diameter is less than 1.5 μm, so that it is possible to make the negative-electrode active-material particles' particle diameters much larger. Accordingly, it is possible to make the film thickness of an SEI film much thinner on the negative-electrode active-material particles' surface, and thereby the resulting film fully follows volumetric changes at the time of charging and discharging, so that it is possible to effectively suppress cracks from generating in the resultant film.

When the entirety of the negative-electrode active-material particles included in the negative electrode is taken as 100% by volume, the negative-electrode active-material particles can preferably include particles, whose particle diameter is 30 μm or less, in an amount of 95% by volume or more of them. Furthermore, they can desirably include particles, whose particle diameter is 30 μm or less, in an amount of 95% by volume or more. When larger particles whose particle diameter exceeds 30 μm comes to be present more, the negative-electrode active-material particles' internal resistance becomes larger because the negative-electrode active material including Si exhibits higher resistance against conduction, so that there might possibly arise such a fear that the resulting batteries' capacities have declined.

The negative-electrode active-material particles can exhibit a "$D_{50}$" that is from 5 μm or more to 10 μm or less. Furthermore, they can preferably exhibit a "$D_{50}$" that is from 5.5 μm or more to 8 μm or less. In these instances, the resulting charging/discharging cyclability further upgrades.

The negative-electrode active-material particles can exhibit a "$D_{10}$" that is 3 μm or more. Furthermore, they can preferably exhibit a "$D_{10}$" that is 3.4 μm or more, or 4.0 μm or more. In these instances, smaller particles whose particle diameter is less than 3 μm comes to be present less among the negative-electrode active-material particles, so that it is possible to suppress decompositions of the electrolytic solution that result from damaged SEI films.

It is allowable that the negative-electrode active-material particles' "$D_{90}$" can be so large to exceed 8.0 μm. Furthermore, it is preferable that the "$D_{90}$" can be 8.5 μm or more, or can be 9.0 μm or more. In these instances, a proportion of the negative-electrode active-material particles whose particle diameter is larger increases, so that the negative-electrode active-material particles, which possess a thinner film, come to be present more. Consequently, it is possible for the thinner film to flexibly follow the negative-electrode active-material particles' volumetric changes. Consequently, damages in the film are less, and thereby the direct contact between the negative-electrode active-material particles and the electrolytic solution is inhibited, so that it is possible to effectively suppress deteriorations of the electrolytic solution, and thereby the resulting charging/discharging cyclability further upgrades.

It is allowable to set an upper limit of the negative-electrode active-material particles' "$D_{90}$" at 30 μm, or furthermore at 25 μm. This is because there might possibly arise such a fear that the resulting batteries' capacities have declined, since the negative-electrode active-material particles' particle diameter becomes too large and thereby the negative-electrode active-material particles' internal resistance becomes larger.

Here, the "$D_{50}$" is referred to a 50%-diameter value in a volume-basis accumulated fraction when finding the integrated volume starting at smaller grain-size-distribution particles, and can also be called a median diameter. The "$D_{10}$" is referred to as a 10%-diameter value in a volume-basis accumulated fraction when finding the integrated volume starting at smaller grain-size-distribution particles. Likewise, the "$D_{90}$" is also referred to as a 90%-diameter value in a volume-basis accumulated fraction when finding the integrated volume starting at smaller grain-size-distribution particles. All of the "$D_{50}$," "$D_{10}$" and "$D_{90}$" are measured by a laser-diffraction-type grain-size-distribution measuring apparatus.

It is preferable that the negative-electrode active-material particles' grain-size range can be set to fall within a range of from 0.4 μm or more to 30 μm or less. The "grain-size range" herein refers to a range of particle diameters of the negative-electrode active-material particles that are included in the negative electrode. When the entire negative-electrode active-material particles are taken as 100% by volume, it is allowable that a proportion of the negative-electrode active-material particles, which possess particle diameters falling within the aforementioned grain-size range, can account for 95% by volume or more among them all.

When being less than 0.4 μm is included in the negative-electrode active-material particles' grain-size range, there might possibly arise such a fear that the resulting charging/discharge cyclability has declined, because fine particles come to be present more in the negative-electrode active-material particles so that an SEI film, which generates at the time of charging, has become thicker. When a range exceeding 30 μm is included in the negative-electrode active-material particles' grain-size range, there might possibly arise such a fear that the resultant capacities have declined, because the negative-electrode active-material particles' internal resistance becomes larger. Moreover, inside the negative-electrode active-material particles, parts that can contribute to battery reactions, and the other parts that cannot contribute to them have arisen, so that the extents of expansion and contraction have come to differ within the particles at the time of battery reactions, and thereby cracks have arisen within the particles, so that there might possibly arise such a fear that the resulting cyclability has declined.

It is preferable that the negative-electrode active-material particles' grain-size range can be from 0.5 μm or more to 30 μm or less, or it is desirable that the grain-size range can be from 1.0 μm or more to 20 μm or less, or can be from 1.37 μm or more to 18.5 μm or less. In these instances, the resulting cyclability further upgrades.

The negative-electrode active-material particles can exhibit a BET specific surface area of 6 $m^2/g$ or less. Furthermore, it is preferable that the BET specific surface area can be 5 $m^2/g$ or less, 4 $m^2/g$ or less, or 3.3 $m^2/g$ or less. The "BET specific surface area" is determined by a method in which molecules with a known adsorption occupation area are adsorbed on a surface of particles of interest to find a specific surface area of the particles from an adsorbed amount of the molecules.

In the above instances, it is possible to make a mutual contact area between the negative-electrode active-material particles larger relatively, and thereby it is possible to make more conductive paths for electrons, so that it is possible to demonstrate a larger first-round discharge capacity.

It is preferable that, of larger particle-diameter particles and smaller particle-diameter particles that are classified particles resulting from subjecting said negative-electrode active-material particles which comprise a negative-electrode active material including Si to a cyclone classification, the negative-electrode active-material particles can comprise the larger particle-diameter particles.

Moreover, the negative-electrode active-material particles included in the negative electrode are not at all limited to particles whose grain size has been adjusted by the aforementioned cyclone classification, but can also be particles whose grain size has been adjusted by means of such a method as classifying methods by sieves, sink-float separating methods, wet-type centrifugal separating methods, dry-type classifying methods, and so on. In the dry-type classifying methods, it is allowable to use a dry-type classifying machine having been developed based on the latest classifying theory that differs from that of the conventional airflow-type classifying machines.

The negative-electrode active-material particles comprise a negative-electrode active material being capable of sorbing and desorbing lithium ions. The negative-electrode active material comprises an element, which is capable of alloying with lithium, or/and an elementary compound, which is capable of alloying with lithium.

Said element, which is capable of alloying with lithium, can comprise at least one element that is selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Even among them, the element can comprise silicon (Si), or tin (Sn). It is allowable that said elementary compound, which includes an element being capable of alloying with lithium, can be a silicon compound, or a tin compound. It is permissible that the silicon compound can be $SiO_x$ (where $0.5 \leq \text{"x"} \leq 1.5$). As the tin compound, tin alloys (such as Cu—Sn alloys or Co—Sn alloys), and the like, can be given, for instance.

Even among those above, the negative-electrode active-material particles can comprise silicon (Si). The negative-electrode active material is capable of sorbing and desorbing lithium ions, and can comprise silicon or/and a silicon compound. The negative-electrode active material can comprise $SiO_x$ (where $0.5 \leq \text{"x"} \leq 1.5$). Silicon has a larger theoretical capacity. On the other hand, since silicon exhibits larger volumetric changes at the time of charging and discharging, using $SiO_x$ instead makes it possible to make volumetric changes less. The components of the negative-electrode active-material particles according to the fourth mode, and the production process for them can be the same as the components of the negative-electrode active-material particles according to the first mode, and the production process for them.

In the fourth mode, a film can also be formed on a surface of the negative-electrode active-material particles in the same manner as the first mode. Moreover, in order to adjust the negative-electrode active-material particles' grain size, it is allowable to carry out a cyclone classification using a centrifugal machine, a dry-type classification, a wet-type classification, a sieving classification, and so on. The components of the negative-electrode active-material particles, and the production process for the negative-electrode active-material particles are the same as those according to the first mode.

In the fourth mode, the negative-electrode active-material particles, which possess the above-mentioned features, constitute a negative-electrode material covering at least a surface of a current collector. It is common that the negative-electrode material is constituted by press attaching the aforementioned negative-electrode material onto a current collector, as a negative-electrode active-material layer. For the current collector, meshes made of metals, such as copper and copper alloys, or metallic foils, can be used, for instance.

After making up a negative-electrode material using the aforementioned negative-electrode active-material particles as the major negative-electrode active material, the other negative-electrode active materials (for example, graphite, Sn, Si, and so on), which have been publicly known already, can even be further added to the resulting negative-electrode material to use.

Besides said negative-electrode active-material particles, a binding agent, a conductive additive, and so on, can also be further included in the negative-electrode material in the same manner as the first mode.

In the fourth mode, a positive electrode used in the lithium-ion secondary battery can comprise: a current collector; and a positive-electrode material including positive-electrode active-material particles to cover a surface of the current collector, in the same manner as the first mode. Moreover, a separator can also be used, if needed, in the same manner as the first mode.

The electrolyte can be included in a nonaqueous electrolytic solution. The nonaqueous electrolytic solution is a solution in which an electrolyte has been caused to dissolve in an organic solvent. It is allowable that the electrolyte can be a fluoride salt (or fluorine salt), and it is preferable that the electrolyte can be an alkali-metal fluoride salt which is soluble in the organic solvent. As for the alkali-metal fluoride salt, it is permissible to use at least one member that is selected from the group consisting of $LiPF_6$, $LiBF_4$, $LiAsF_6$, $NaPF_6$, $NaBF_4$, and $NaAsF_6$, for instance.

It is allowable that the organic solvent in the nonaqueous electrolytic solution can be an aprotic organic solvent. For example, it is permissible to use a ring-shaped carbonate or chain-shaped carbonate, ethers, and so on. It is preferable that the solvent in the electrolytic solution can comprise a ring-shaped carbonate including ring-shaped ethylene carbonate, and chain-shaped carbonate. Since the ring-shaped carbonate has a higher dielectric constant, and since the chain-shaped carbonate has a lower viscosity, they do not interfere with the movements of Li ions, so that it is possible to cause the resulting batteries' capacities to upgrade.

When the solvents as a whole in the electrolytic solution are taken as 100% by volume, the ring-shaped carbonate can account for from 30 to 50% by volume or less, and said chain-shaped carbonate can account for from 50 to 70% by volume. Whereas the ring-shaped carbonate enhances the electrolytic solution's dielectric constant, it has a higher viscosity. When the dielectric constant goes up, the electrolytic solution's conductivity becomes better. When the viscosity is high, the movements of Li ions are interfered to make the conductivity worse. Although the chain-shaped carbonate has a lower dielectric constant, it has a lower viscosity. Blending both of them in a well-balanced manner in a range of the above-mentioned blending ratio leads to making the resulting solvent's dielectric constant higher to a certain extent, or moreover to also making its viscosity lower, and thereby it is possible to prepare solvents with better conductivity, so that it is possible to cause the resultant batteries' capacities to upgrade.

The ring-shaped carbonate has fluorinated ethylene carbonate as the indispensable component. In addition to that, the ring-shaped carbonate can also further include one or more members that are selected from the group consisting of propylene carbonate (or PC), ethylene carbonate (or EC), butylene carbonate, gamma-butyrolactone, vinylene carbonate, 2-methyl-gamma-butyrolactone, acetyl-gamma-butyrolactone, and gamma-valerolactone.

The above results from the fact that fluorinated ethylene carbonate makes a film, which is formed on the negative-electrode active-material particles' surface, more stable and firmer, because it is a ring-shaped carbonate possessing at least one fluorine group within the molecule, and because the fluorine group becomes one of the film's constituent elements. As for the fluorinated ethylene carbonate, it is preferable to use fluoroethylene carbonate (or FEC), difluoroethylene carbonate, or trifluoroethylene carbonate, and the like. Among them, it is especially preferable to use FEC when taking the acid resistance into consideration.

It is preferable that the fluorinated ethylene carbonate can account for from 1% by volume or more to 30% by volume or less when the solvents as a whole in the electrolytic solution are taken as 100% by volume. In this instance, it is possible to cause the resulting charging/discharging cyclability to upgrade effectively, and simultaneously it is possible to cause the resultant batteries' capacities to upgrade more because the electrolytic solution's viscosity is also suppressed lower to make Li ions likely to move around. On the other hand, in a case where the fluorinated ethylene carbonate accounts for less than 1% by volume, there might possibly arise such a fear that an extent of upgrading the resulting cyclability has become lower. In another case where the fluorinated ethylene carbonate accounts for more than 30% by volume, the resultant electrolytic solution's high-temperature characteristics decline, and thereby the fluorinated ethylene carbonate is decomposed by high temperatures, so that its decomposed products make a cause of making the resulting batteries' internal resistance higher.

The chain-shaped carbonate used in the organic solvent can have a chain shape, but is not limited especially at all. For example, it is possible to use one or more members that are selected from dimethyl carbonate (or DMC), diethyl carbonate (or DEC), ethyl methyl carbonate (or EMC), dibutyl carbonate, dipropyl carbonate, propionic alkyl ester, malonic dialkyl ester, and acetic alkyl ester.

Moreover, as for the ethers used in the organic solvent, it is possible to use tetrahydrofuran, 2-methyl tetrahydrofuran, 1,4-dioxane, 1,2-dimethoxy ethane, 1,2-diethoxy ethane, or 1,2-dibutoxy ethane, and the like, for instance.

In the fourth mode, other elements or features can be the same as those according to the first through third modes.

(5) Others

It is possible to extract preferable modes from among the above-mentioned first through fourth modes to combine them one another. For example, the following modes can be given.

a) A negative-electrode material comprising the negative-electrode active-material particles that include an element being capable of sorbing and desorbing lithium ions and being capable of undergoing an alloying reaction with lithium, or/and an elementary compound being capable of undergoing an alloying reaction with lithium.

b) In said a), the negative-electrode material in which said negative-electrode active-material particles include particles whose particle diameter is 1 μm or more in an amount of 85% by volume or more of them when the entirety is taken as 100% by volume.

c) In said a) or b), the negative-electrode material in which said negative-electrode active-material particles exhibit a BET specific surface area that is 6 m$^2$/g or less.

d) In any of said a) through c), the negative-electrode material in which said negative-electrode active-material particles exhibit a "$D_{50}$" that is 4.5 μm or more.

e) In any of said a) through d), the negative-electrode material in which said negative-electrode active-material particles exhibit a grain-size range that is from 0.4 μm or more to 30 μm or less.

f) In any of said a) through e), the negative-electrode material in which said negative-electrode active-material particles exhibit a "$D_{10}$" that is 3 μm or more.

g) In any of said a) through f), the negative-electrode material in which said negative-electrode active-material particles exhibit a "$D_{90}$" that is so large to exceed 8.0 μm.

h) A negative electrode for lithium-ion secondary battery, the negative electrode comprising a current collector, and a negative-electrode active-material layer formed on a surface of the current collector, wherein said negative-electrode active-material layer is constituted of any of the negative-electrode materials according to said a) through g) and said negative-electrode active-material layer has a thickness that is 1.4 times or more of said negative-electrode active-material particles' "$D_{90}$."

i) A negative electrode for lithium-ion secondary battery, the negative electrode comprising a current collector, and a negative-electrode active-material layer formed on a surface of the current collector, wherein said negative-electrode active-material layer is constituted of any of the negative-electrode materials according to said a) through g) and said negative-electrode active-material layer has a thickness that is three times or more of said negative-electrode active-material particles' "$D_{10}$."

j) In any of said a) through g), a lithium-ion secondary battery comprising: a negative electrode including said negative-electrode active-material particles; a positive electrode possessing a positive-electrode active material that enables Li ions to be sorbed therein and desorbed therefrom; and an electrolytic solution made by dissolving an electrolyte in a solvent, wherein said solvent in said electrolytic solution has fluorinated ethylene carbonate.

k) A lithium-ion secondary battery comprising: the negative electrode for lithium-ion secondary battery according to said h) or i); a positive electrode possessing a positive-electrode active material that enables Li ions to be sorbed therein and desorbed therefrom; and an electrolytic solution made by dissolving an electrolyte in a solvent, wherein said solvent in said electrolytic solution has fluorinated ethylene carbonate.

Making of Secondary Battery

Negative-electrode active-material particles according to each of Sample Nos. 1 through 4 that had been prepared in advance, a natural graphite powder and KETJENBLACK that served as conductive additives, and polyamide-imide that served as a binding agent were mixed one another, and then a solvent was added to them, thereby obtaining a slurry-like mixture. The solvent was N-methyl-2-pyrrolidone (or NMP). A mass ratio between the negative-electrode active-material particles, the natural graphite particles, KETJENBLACK and the polyamide-imide was "Negative-electrode Active-material Particles"/"Natural Graphite Particles"/"KETJENBLACK"/"Polyamide-imide"=42/40/2/3/15 by percentage.

Next, the slurry-like mixture was formed as a film on one of the opposite faces of a copper foil, namely, a current collector, using a doctor blade, was pressed under a predetermined pressure, was heated at 200° C. for two hours, and was left to cool. Thus, a negative electrode was formed which was completed by fixating a negative-electrode active-material layer onto a surface of the current collector.

Next, a lithium-nickel-based composite oxide that served as a positive-electrode active material, namely, $LiNi_{1/3}Co_{1/3}Mn_{1/3}O_2$, acetylene black, and polyvinylidene fluoride (or PVDF) that served as a binding agent were mixed one another to turn them into a slurry. Then, the resulting slurry was coated onto one of the opposite faces of an aluminum foil that served as a current collector, was pressed, and was calcined. A mass ratio between the lithium-nickel-based composite oxide, the acetylene black, and the polyvinylidene fluoride was set at "Lithium-nickel-based Composite Oxide"/"Acetylene Black"/"Polyvinylidene Fluoride"=88/6/6. Thus, a positive electrode was obtained which was completed by fixating a positive-electrode active-material layer onto a surface of the current collector.

A polypropylene porous membrane that served as a separator was tucked between the positive electrode and the negative electrode. The resulting electrode assembly that comprised the positive electrode, the separator and the negative electrode was stacked one after another in a quantity of multiple pieces. Two pieces of aluminum films were sealed by doing heat adhesion at the circumference except for one of the sides, and were thereby turned into a bag shape. The stacked electrode assemblies were put into the bag-shaped aluminum films, and the an electrolytic solution was further put into it. The electrolytic solution had been completed by dissolving $LiPF_6$ serving as an electrolyte in an organic solvent. The organic solvent was prepared by mixing ethylene carbonate (or EC), ethyl methyl carbonate (or EMC) and dimethyl carbonate (or DMC) in such a blending ratio as EC/EMC/DMC=3/3/4 by volumetric percentage. A concentration of $LiPF_6$ in the electrolytic solution was 1 $mol/dm^3$.

Thereafter, the aluminum films' opening side was sealed air tightly completely while doing vacuuming. On this occasion, the electrode assemblies' positive-electrode-side and negative-electrode-side leading ends were projected from out of the films' end rim in order to make them connectable with external terminals, thereby obtaining a lithium-ion secondary battery.

A conditioning treatment was carried out to the lithium-ion secondary battery. In the conditioning treatment, a charging/discharging operation was carried out at 25° C. as many as three rounds repeatedly. In the first round, the charging condition was set at CC (i.e., constant current) charging at 0.2 C up to 4.1 V, and the discharging condition was set at CC discharging at 0.2 C down to 3 V cut-off. In the second round, the charging condition was set at CC-CV (i.e., constant current-constant voltage) charging at 0.2 C and 4.1 V, and the discharging condition was set at CC discharging at 0.1 C down to 3 V cut-off. In the third round, the charging condition was set at CC-CV charging at 1 C and 4.2 V, and the discharging condition was set at CC discharging at 1 C down to 3 V cut-off.

Discharge-Capacity Maintenance Rate

A cyclic test was carried out for the lithium-ion secondary battery. The cyclic test was carried out at 25° C. while setting the charging condition at CC (i.e., constant current) charging at 1 C up to 4.2V and setting the discharging condition at CC discharging at 1 C down to 2.5 V. The first charging/discharging test following the conditioning treatment was labeled the first cycle, and the identical charging/discharging operation was then carried out repeatedly up to the 150th cycle. Upon the first and the 150th charging/discharging operations, discharge capacities were measured in order to calculate a 150th discharge-capacity maintenance rate. The "150th discharge-capacity maintenance rate" is a value that can be found by the percentage of a value that is obtained by dividing the 150th discharge capacity by the first-round discharge capacity (i.e., {(150th-cycle Discharge Capacity)/(First-cycle Discharge Capacity)}×100). The resulting 150th discharge-capacity maintenance rates are shown in FIG. 2 and Table 2.

Figure 2:
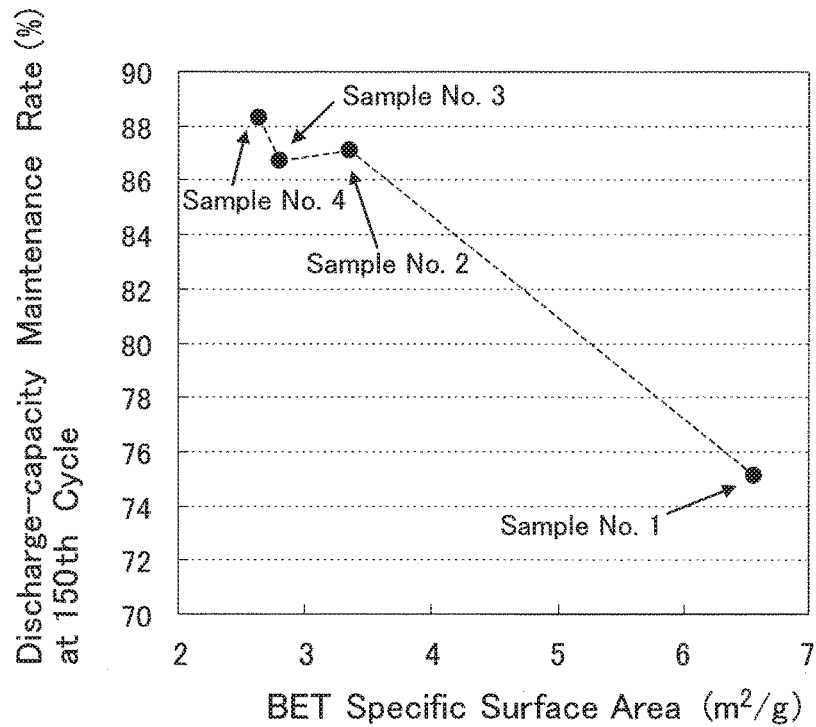
FIG. 2 is a diagram that shows the relationship between the BET specific surface area of Sample Nos. 1 through 4 and the discharge-capacity maintenance rate at the 150th cycle.

As shown in FIG. 2 and Table 2, the batteries using the negative-electrode active-material particles according to Sample Nos. 2 through 4 had an extremely higher 150th discharge-capacity maintenance rate, respectively, than did the battery using the negative-electrode active-material particles according to Sample No. 1. In addition, the discharge-capacity maintenance rate was much higher when using, even among Sample Nos. 2 through 4, the negative-electrode active-material particles according to Sample No. 4.

Figure 3:
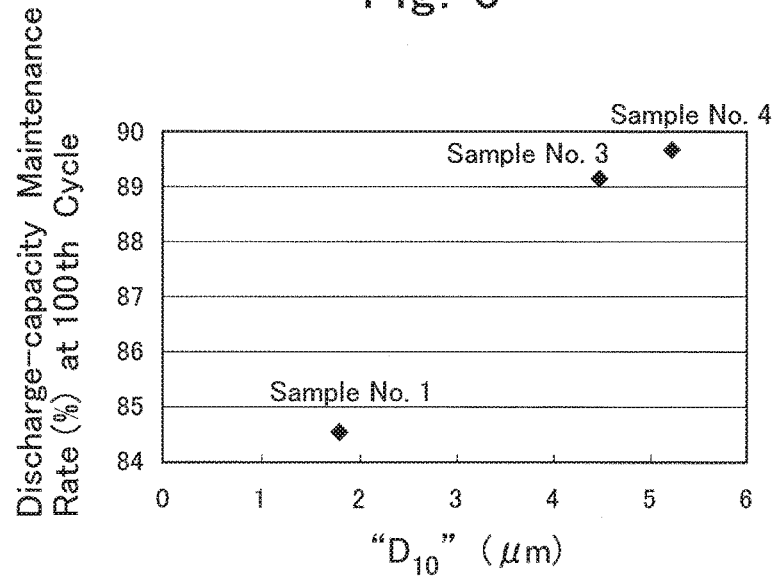
FIG. 3 is a diagram that shows the relationship between the "$D_{10}$" of Sample Nos. 1, 3 and 4 and the discharge-capacity maintenance rate at the 100th cycle.

FIG. 3 shows relationships between the "$D_{10}$" of the negative-electrode active-material particles according to Sample Nos. 1, 3 and 4 and the 100th discharge-capacity maintenance rate. A secondary battery was made for every sample in the same manner as aforementioned in order to measure the 100th cycle discharge-capacity maintenance rate. The "100th discharge-capacity maintenance rate" is a value that can be found by the percentage of a value that is obtained by dividing the 100th-cycle discharge capacity by the first-round discharge capacity (i.e., {(100th-cycle Discharge Capacity)/(First-cycle Discharge Capacity)}×100).

As shown in FIG. 3 and Table 2, the 100th discharge-capacity maintenance rate was remarkably higher in the batteries made by using the negative-electrode active-material particles according to Sample Nos. 3 and 4 than in the case of Sample No. 1.

From those above, it was understood that the negative-electrode active-material particles' BET specific surface area that is 6 $m^2/g$ or less, and said negative-electrode active-material particles' "$D_{50}$" that is 4.5 μm or more result in causing the resulting batteries' cyclability to upgrade. Moreover, it was understood that the resultant batteries' cyclability further upgrades when said negative-electrode active-material particles' grain-size range is from 0.4 μm or more to 30 μm or less, or when the "$D_{10}$" is 3 μm or more. It was understood that it is allowable that the negative-electrode active-material particles' "$D_{90}$" can be so large to exceed 8.0 μm or more. Furthermore, it was understood that it is permissible that the "$D_{90}$" can be 8.5 μm or more. Moreover, it was also understood that it is allowable that the negative-electrode active-material particles can include particles, which possess a particle diameter of 1 μm or more, in an amount of 85% by volume or more of them when the entirety is taken as 100% by volume. In addition, it was also understood that it is permissible that the negative-electrode active-material particles can include particles, which possess a particle diameter of 1 μm or more, in an amount of 95% by volume or more of them when the entirety is taken as 100% by volume.

First-Round Discharge Capacity

Figure 4:
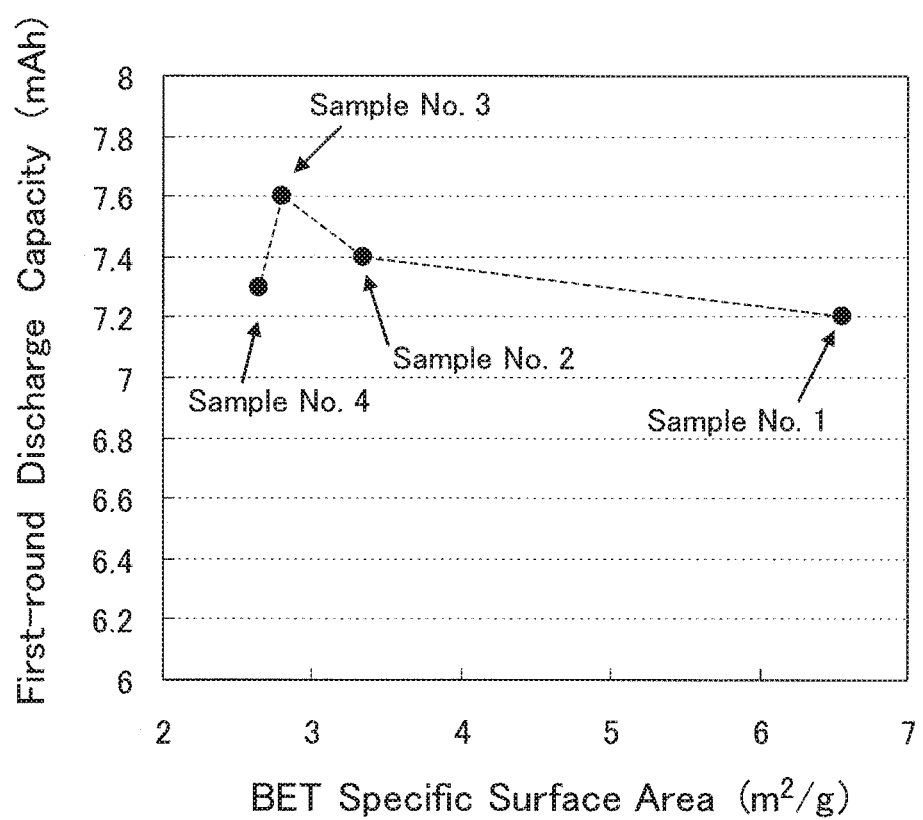
FIG. 4 is a diagram that shows the relationship between the BET specific surface area of Sample Nos. 1 through 4 and the first-round discharge capacity.

Next, a first-round discharge capacity of the batteries using the negative-electrode active-material particles according to Sample Nos. 1 through 4 was measured, respectively. The "first-round discharge capacity" is a capacity at the time of first-round discharging that was carried out after the conditioning treatment. As shown in FIG. 4 and Table 2, the batteries using the negative-electrode active-material particles according to Sample Nos. 2 through 4 had a higher first-round discharge capacity, respectively, than did the battery using the negative-electrode active-material particles according to Sample No. 1. Even among Sample Nos. 2 through 4, the first-round discharge capacity was much higher in the case of Sample Nos. 2 and 3. Furthermore, the first-round discharge capacity was the highest in the case of Sample No. 3.

From those above, it was understood that the negative-electrode active-material particles including particles whose particle diameter is 1 μm or more in an amount of 95% by volume or more of them when the entirety is taken as 100% by mass, the negative-electrode active-material particles' BET specific surface area that is 5 $m^2/g$ or less, and the negative-electrode active-material particles' "$D_{50}$" that is from 5.0 µm or more to 8.0 µm or less result in making the resulting first-round discharge capacity higher.

In order to further enhance the resulting first-round discharge capacity, it was understood that it is allowable that the negative-electrode active-material particles' grain size can be from 0.4 µm or more to 20.0 µm or less. Moreover, it was also understood that it is permissible that the negative-electrode active-material particles' "$D_{50}$" can be from 5.7 µm or more to 7.2 µm or less; that it is allowable that the negative-electrode active-material particles' BET specific surface area can be from 2.5 m$^2$/g or more to 5.0 m$^2$/g or less; and that it is permissible that the negative-electrode active-material particles' "$D_{90}$" can be so large to exceed 8.0 µm.

Moreover, from those above, it was understood that the negative-electrode active-material particles' BET specific surface area that is 6 m$^2$/g or less, the negative-electrode active-material particles' "$D_{50}$" that is from 4.5 µm or more to 8.0 µm or less, and the negative-electrode active-material particles' grain-size range that is from 0.4 µm or more to 30 µm or less result in making the resulting first-round discharge capacity higher. Moreover, it was understood that it is allowable that negative-electrode active-material particles' "$D_{10}$" can be 3.0 µm or more; that the "$D_{50}$" can be from 5.7 µm or more to 7.2 µm or less; that the negative-electrode active-material particles' BET specific surface area can be from 2.5 m$^2$/g or more to 5.0 m$^2$/g or less; and that the negative-electrode active-material particles' "$D_{90}$" that is so large to exceed 8.0 µm results in making the resultant first-round discharge capacity much higher. It was understood that it is permissible that the negative-electrode active-material particles can include particles which possess a particle diameter of 1 µm or more in an amount of 85% by volume or more of them when the entirety is taken as 100% by volume. Furthermore, it was understood that it is preferable that the negative-electrode active-material particles can include particles, which possess a particle diameter of 1 µm or more, in an amount of 95% by volume or more of them when the entirety is taken as 100% by volume.

Reactive Resistance of Negative Electrode

Figure 5:
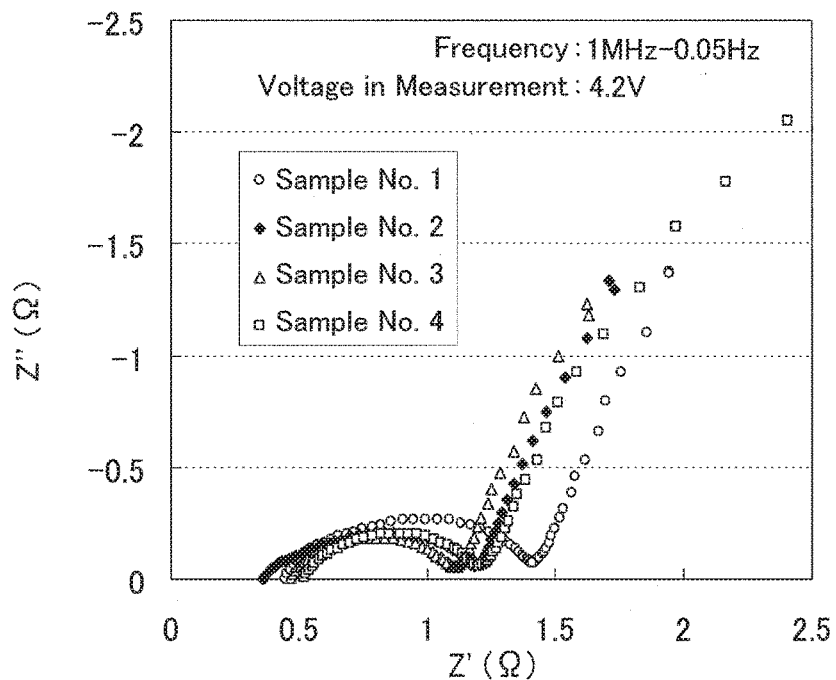
FIG. 5 is a diagram that shows the reactive resistances of Sample Nos. 1 through 4.

A reactive resistance of the negative electrodes made with use of the negative-electrode active-material particles according to Sample Nos. 1 through 4 was measured, respectively. In order to measure the negative electrodes' reactive resistance, an alternate-current impedance measurement was carried out for the aforementioned secondary batteries made with use of the negative electrodes. The frequency of an electric current was from 1 MHz to 0.05 Hz, and the secondary batteries were charged up to 4.2 V in a constant-current and constant voltage (or CC-CV) mode under such conditions as 1 C and 25° C. The alternate-current impedance measurement was carried out under such a condition as placing the secondary batteries, which had been put in the charged state, under the frequency condition of from 1 MHz to 0.05 Hz. Measured results are shown in FIG. 5. In FIG. 5, the horizontal axis stands for the real part of resistance, whereas the vertical axis stands for the imaginary part of the resistance. In the lined or curved sections illustrated in FIG. 5, the width between the opposite ends in the arc-shaped fractions shows the resistance of a film on the negative-electrode active-material particles, and the resistance against Li ions, which diffused into the particles' inside, at the particles' interface; whereas fractions at which the real parts' resistance is larger than the arc-shaped fractions' resistance show the resistance against Li ions that diffused within the negative-electrode active-material particles.

As shown in FIG. 5, the negative electrodes' reactive resistance was smaller when the negative-electrode active-material particles according to Sample Nos. 2 through 4 were used than when the negative-electrode active-material particles according to Sample No. 1 were used. Even among Sample Nos. 2 through 4, Sample No. 3 had the smallest reactive resistance. The fact becomes a factor that the first-round discharge capacity of the negative-electrode active-material particles according to Sample No 3 becomes a relative maximum.

The following can be assumed when cross-checking those above with the results on the first-round discharge capacity in FIG. 4. The negative electrodes' reactive resistance shows a summed value of the resistance of a film on the negative-electrode active-material particles, and the resistance against Li ions, which diffused into the particles' inside, at the particles' interface. The smaller the negative-electrode active-material particles' particle diameter becomes, the smaller the resistance becomes against Li ions diffusing into the particles' inside. When a film is formed at the interface between the negative-electrode active-material particles, the thinner the resulting film becomes on the particles' surface, the smaller the film's resultant resistance becomes on the negative-electrode active-material particles. On the other hand, the smaller the negative-electrode active-material particles' particle diameter is, the thicker the resulting film is formed. It is believed that it is possible to make the resulting batteries' first-round discharge capacity larger by making the resultant impedance smaller with particle diameters that fall within a well-balanced range involving particle diameters that make the resulting SEI film thinner, but, to such an extent that does not make the resistance against Li ions diffusing into the particles' inside larger.

TABLE 1

| | BET Specific Surface Area (m$^2$/g) | "$D_{10}$" (µm) | "$D_{50}$" (µm) | "$D_{90}$" (µm) | Grain-size Range (µm) | |
|---|---|---|---|---|---|---|
| Sample No. 1 | 6.6 | 1.4 | 4.4 | 8.0 | 0.34-18.5 | 1 µm or more in an amount of 93.3% |
| Sample No. 2 | 3.3 | 3.4 | 5.7 | 8.8 | 1.37-18.5 | 1 µm or more in an amount of 100% |
| Sample No. 3 | 2.8 | 4.4 | 6.4 | 9.2 | 2.31-18.5 | 2 µm or more in an amount of 100% |
| Sample No. 4 | 2.7 | 5.4 | 7.2 | 10.0 | 3.27-18.5 | 4 µm or more in an amount of 93.3% |

TABLE 2

| | 150th-cylcle Discharge-capacity Maintenance Rate (%) | 100th-cycle Discharge-capacity Maintenance Rate (%) | First-round Discharge Capacity (mAh) |
|---|---|---|---|
| Sample No. 1 | 75.1 | 84.5 | 7.2 |
| Sample No. 2 | 87.1 | 89.3 | 7.4 |
| Sample No. 3 | 87.6 | 89.1 | 7.6 |
| Sample No. 4 | 88.3 | 89.7 | 7.3 |

(2) The lithium-ion secondary battery according to the third mode of the present invention was manufactured in six kinds, namely, Battery Nos. 1 through 6, as follows. Then, a charging/discharging cyclic evaluation test was carried out. Battery Nos. 1 through 6 were embodiments according to the present invention.

Battery No. 1

First of all, a commercially available SiO powder was subjected to a heat treatment that was carried out in an inert gas atmosphere under a temperature of 900° C. for 2 hours. Thus, the SiO powder was disproportionated, and thereby negative-electrode active-material particles were obtained. Upon carrying out an X-ray diffraction (or XRD) measurement that employed CuKα for the resulting negative-electrode active-material particles, the specific peaks deriving from elementary-substance silicon and silicon dioxide could be ascertained. On account of this, it was understood that elementary-substance silicon and silicon dioxide were generated in the negative-electrode active-material particles.

Figure 7:
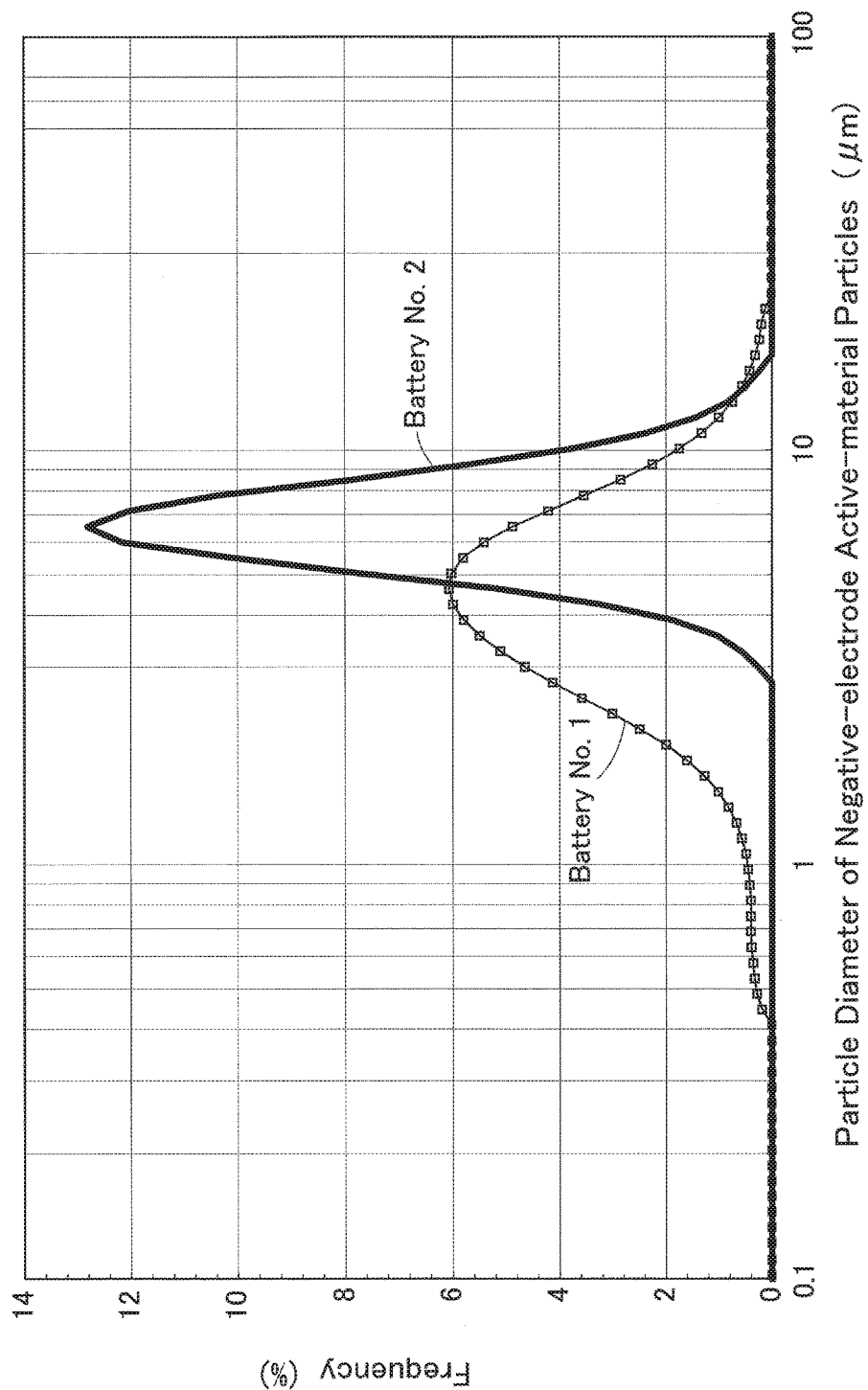
FIG. 7 is a diagram that shows the grain-size distributions of negative-electrode active-material particles that were used in Battery Nos. 1 and 2.

The disproportionated negative-electrode active-material particles' grain-size distribution was measured, and those results are shown in FIG. 7. The negative-electrode active-material particles' BET specific area was 6.6 m$^2$/g, and their "$D_{10}$," "$D_{50}$" and "$D_{90}$" were 1.4 µm, 4.4 µm and 8.0 µm, respectively. Their grain size was from 0.34 to 18.5 µm.

The thus prepared respective negative-electrode active-material particles, a natural graphite powder and KETJENBLACK that served as conductive additives, and polyamide-imide that served as a binding agent were mixed one another, and then a solvent was added to them, thereby obtaining a slurry-like mixture. The solvent was N-methyl-2-pyrrolidone (or NMP). A mass ratio between the negative-electrode active-material particles, the natural graphite particles, KETJENBLACK and the polyamide-imide was "Negative-electrode Active-material Particles"/"Natural Graphite Particles"/"KETJENBLACK"/"Polyamide-imide"=42/40/2/3/15 by percentage.

Next, the slurry-like mixture was formed as a film on one of the opposite faces of a copper foil, namely, a current collector, using a doctor blade, was pressed by a roll-pressing method, was heated at 200° C. for two hours, and was left to cool. Thus, a negative electrode was formed which was completed by fixating a negative-electrode active-material layer onto a surface of the current collector. The negative-electrode active-material layer's thickness was set at 15 µm, and the negative-electrode active-material particles' ratio was set at 42% by mass when a mass of the entire negative-electrode active-material particles was taken as 100% by mass.

Next, a lithium-nickel-based composite oxide that served as a positive-electrode active material, namely, LiNi$_{1/3}$Co$_{1/3}$Mn$_{1/3}$O$_2$, acetylene black, and polyvinylidene fluoride (or PVDF) that served as a binder were mixed one another to turn them into a slurry. Then, the resulting slurry was coated onto one of the opposite faces of an aluminum foil that served as a current collector, was pressed, and was calcined. A mass ratio between the lithium-nickel-based composite oxide, the acetylene black, and the polyvinylidene fluoride was set at "Lithium-nickel-based Composite Oxide"/"Acetylene Black"/"Polyvinylidene Fluoride"=88/6/6. Thus, a positive electrode was obtained which was completed by fixating a positive-electrode active-material layer onto a surface of the current collector.

A polypropylene porous membrane that served as a separator was tucked between the positive electrode and the negative electrode. The resulting electrode assembly that comprised the positive electrode, the separator and the negative electrode was stacked one after another in a quantity of multiple pieces. Two pieces of aluminum films were sealed by doing heat adhesion at the circumference except for one of the sides, and were thereby turned into a bag shape. The stacked electrode assemblies were put into the bag-shaped aluminum films, and then an electrolytic solution was further put into it. The electrolytic solution had been completed by dissolving LiPF$_6$ serving as an electrolyte in an organic solvent. The organic solvent was prepared by mixing ethylene carbonate (or EC), ethyl methyl carbonate (or EMC) and dimethyl carbonate (or DMC) in such a blending ratio as EC/EMC/DMC=30/30/40 by volumetric percentage. A concentration of the LiPF$_6$ in the electrolytic solution was 1 mol/L (or M).

Thereafter, the aluminum films' opening side was sealed air tightly completely while doing vacuuming. On this occasion, the electrode assemblies' positive-electrode-side and negative-electrode-side leading ends were projected from out of the films' end rim in order to make them connectable with external terminals, thereby obtaining a lithium-ion secondary battery.

A conditioning treatment was carried out to the lithium-ion secondary battery. In the conditioning treatment, a charging/discharging operation was carried out at 25° C. as many as three rounds repeatedly.

Battery No. 2

A cyclone classification was carried out to the negative-electrode active-material particles used in Battery No. 1, thereby preparing negative-electrode active-material particles used in Battery No. 2. In the cyclone classification, a cyclone classification was carried out using a powder classifying machine (e.g., "TURBO CLASSIFIER," a product of NISSIN ENGINEERING) under the following conditions: the number of revolutions: 10,000 rpm; the overall air amount: 3.0 m$^3$/minute; and the supply amount of the negative-electrode active-material particles: 1.5 kg/hour. The negative-electrode active-material particles, which had been charged into the classifying rotor, received centrifugal forces, which resulted from the rotary classification, and drag forces, which resulted from air flowing radially toward the center. Of these particles, coarser particles, in which such a relationship as "(Centrifugal Force)>(Drag Force)" was established, were caused to fly toward the outside of the classifying rotor, whereas finer particles, in which such another relationship as "(Centrifugal Force)<(Drag Force)" was established, were caused to move together with the air radially toward the center. The coarser particles, which had been caused to fly outward, were used in Battery No. 2.

The coarser particles used in Battery No. 2 had a BET specific surface area that was 2.8 m$^2$/g, a "$D_{10}$" that was 4.4 µm, a "$D_{50}$" that was 6.4 µm, a "$D_{90}$" that was 9.2 µm, and a grain-size range that was from 2.31 µm to 18.5 µm. When the recovered negative-electrode active-material particles used in Battery No. 2 as a whole were taken as 100% by volume, particles whose particle diameter was 2 µm or more accounted for 100% by volume. A grain-size distribution according to Battery No. 2 is shown in FIG. 7. Other issues or elements or features in Battery No. 2 were the same as those in Battery No. 1.

Battery No. 3

A cyclone classification was carried out to the negative-electrode active-material particles used in Battery No. 1, thereby preparing negative-electrode active-material particles used in Battery No. 3. The cyclone classification was carried out using the same apparatus as used when doing the classification for Battery No. 2 under the following conditions: the number of revolutions: 4,000 rpm; the overall air amount; 2.0 m³/minute; and the supply amount of the negative-electrode active-material particles: 1 kg/hour. As shown in Table 3, the recovered negative-electrode active-material particles used in Battery No. 3 had a BET specific surface area that was 2.7 m²/g, a "$D_{10}$" that was 5.4 µm, a "$D_{50}$" that was 7.2 µm, a "$D_{90}$" that was 10.0 µm, and a grain-size range that was from 3.27 µm to 18.5 µm. When the recovered negative-electrode active-material particles used in Battery No. 3 as a whole were taken as 100% by volume, particles whose particle diameter was 4 µm or more accounted for 99.3% by volume. Others were the same as those in Battery No. 1.

Battery No. 4

Battery No. 4 was manufactured with use of the negative-electrode active-material particles used in Battery No. 1. Battery No. 4 had, however, an organic solvent in the electrolytic solution that had been prepared by mixing fluoroethylene carbonate (or FEC), ethylene carbonate (or EC), ethyl methyl carbonate (or EMC) and dimethyl carbonate (or DMC) in such a blending ratio as FEC/EC/EMC/DMC=4/26/30/40 by volumetric percentage. Others were the same as those in Battery No. 1.

Battery No. 5

Battery No. 5 was manufactured with use of the negative-electrode active-material particles used in Battery No. 2. Battery No. 5 had, in the same manner as Battery No. 4, an organic solvent in the electrolytic solution that had been prepared by mixing the components in such a blending ratio as FEC/EC/EMC/DMC=4/26/30/40 by volumetric percentage. Others were the same as those in Battery No. 1.

Battery No. 6

Battery No. 6 was manufactured with use of the negative-electrode active-material particles used in Battery No. 3. Battery No. 6 had, in the same manner as Battery No. 4, an organic solvent in the electrolytic solution that had been prepared by mixing the components in such a blending ratio as FEC/EC/EMC/DMC=4/26/30/40 by volumetric percentage. Others were the same as those in Battery No. 1.

TABLE 3

| | Negative-electrode Active-material Particles | | | | | | | |
|---|---|---|---|---|---|---|---|---|
| | BET Specific Surface Area (m²/g) | "$D_{10}$" (µm) | "$D_{50}$" (µm) | "$D_{90}$" (µm) | "$D_{10}$"/"$D_{90}$" | "$D_{50}$"/"$D_{90}$" | Grain-size Range (µm) | |
| Battery No. 1 | 6.6 | 1.4 | 4.4 | 8.0 | 0.2 | 0.6 | 0.34-18.5 | — |
| Battery No. 2 | 2.8 | 4.4 | 6.4 | 9.2 | 0.5 | 0.7 | 2.31-18.5 | 2 µm or more in an amount of 100% |
| Battery No. 3 | 2.7 | 5.4 | 7.2 | 10.0 | 0.5 | 0.7 | 3.27-18.5 | 4 µm or more in an amount of 99.3% |
| Battery No. 4 | 6.6 | 1.4 | 4.4 | 8.0 | 0.2 | 0.6 | 0.34-18.5 | — |
| Battery No. 5 | 2.8 | 4.4 | 6.4 | 9.2 | 0.5 | 0.7 | 2.31-18.5 | 2 µm or more in an amount of 100% |
| Battery No. 6 | 2.7 | 5.4 | 7.2 | 10.0 | 0.5 | 0.7 | 3.27-18.5 | 4 µm or more in an amount of 99.3% |

TABLE 4

| | Negative-electrode Active-material Layer | | | | Electrolytic Solution | |
|---|---|---|---|---|---|---|
| | Layer Thickness (µm) | Layer Thickness/"$D_{90}$" | Layer Thickness/"$D_{50}$" | Layer Thickness/"$D_{10}$" | Electrolyte | Solvent (% by volume) |
| Battery No. 1 | 15 | 1.9 | 3.4 | 10.7 | 1M LiPF$_6$ | EC/EMC/DMC = 30/30/40 |
| Battery No. 2 | 15 | 1.6 | 2.4 | 3.3 | 1M LiPF$_6$ | EC/EMC/DMC = 30/30/40 |
| Battery No. 3 | 15 | 1.5 | 2.1 | 2.8 | 1M LiPF$_6$ | EC/EMC/DMC = 30/30/40 |

TABLE 4-continued

| | Negative-electrode Active-material Layer | | | | Electrolytic Solution | |
|---|---|---|---|---|---|---|
| | Layer Thickness (μm) | Layer Thickness/ "D₉₀" | Layer Thickness/ "D₅₀" | Layer Thickness/ "D₁₀" | Electrolyte | Solvent (% by volume) |
| Battery No. 4 | 15 | 1.9 | 3.4 | 10.7 | 1M LiPF₆ | FEC/EC/EMC/DMC = 4/26/30/40 |
| Battery No. 5 | 15 | 1.6 | 2.4 | 3.3 | 1M LiPF₆ | FEC/EC/EMC/DMC = 4/26/30/40 |
| Battery No. 6 | 15 | 1.5 | 2.1 | 2.8 | 1M LiPF₆ | FEC/EC/EMC/DMC = 4/26/30/40 |

Charging/Discharging Cyclic Test

A charging/discharging cyclic test was carried out for Battery Nos. 1 through 6 at 25° C. The cyclic test's charging condition was set at CC (i.e., constant current) charging at 1 C up to 4.2 V, and the discharging condition was set at CC (i.e., constant current) discharging at 1 C down to 2.5 V. The first charging/discharging test following the conditioning treatment was labeled the first cycle, the identical charging/discharging operation was carried out repeatedly up to the 500th cycle.

Figure 8:
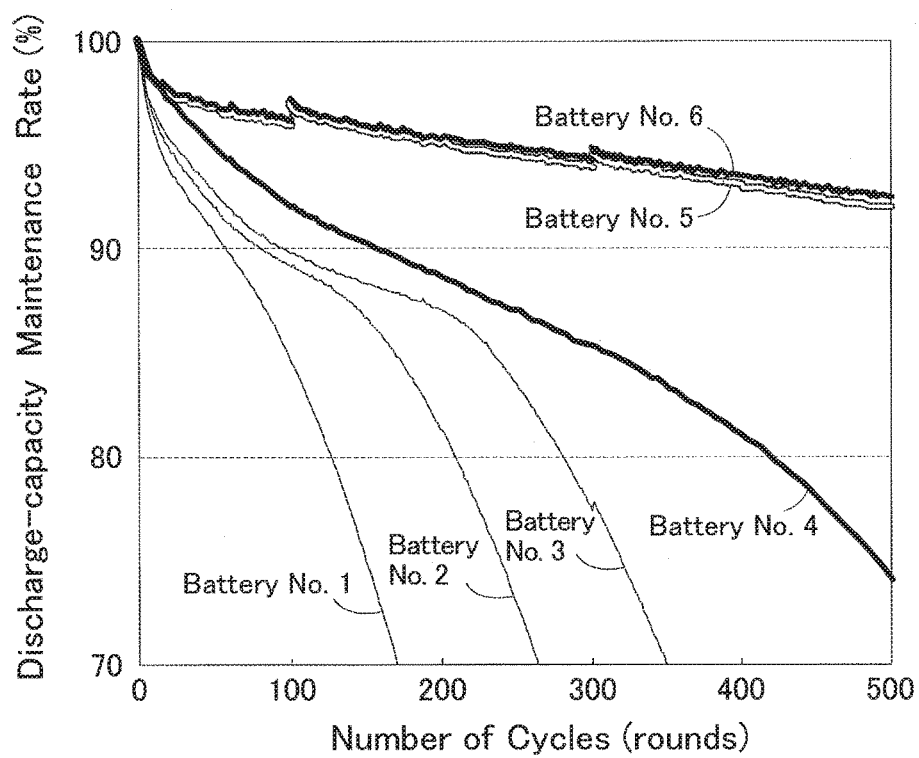
FIG. 8 is a diagram that shows the results of a charging/discharging cyclic evaluation test for Battery Nos. 1 through 6.

As shown in FIG. 8, the cyclability upgraded in the order of Battery Nos. 1, 2 and 3. This indicates that the larger the negative-electrode active-material particles' "D₁₀" and "D₅₀" became, and moreover the smaller the negative-electrode active-material particles' specific surface area became, the more the resulting cyclability upgraded.

Battery No. 4, which comprised FEC that was added to the organic solvent in the electrolytic solution, exhibited the markedly upgraded cyclability, compared with those of Battery Nos. 1, 2 and 3 free from the FEC addition. This is believed to result from the following: FEC became one of the constituent components of LiF within a film, and thereby the resulting film is generated stably and firmly, so that the negative-electrode active material was inhibited from contacting directly with the electrolytic solution, and thereby the electrolytic solution was suppressed from decomposing.

As shown in FIG. 8, Battery Nos. 5 and 6 had the remarkably upgraded cyclability, compared with that of Battery No. 4. This is because of the following: FEC was added to the electrolytic solution; the entirety of the negative-electrode active-material particles further exhibited 2 μm or more in Battery No. 5; and particles having 4 μm or more accounted for 99.3% in Battery No. 6 when the entirety of the negative-electrode active-material particles was taken as 100% by volume, so that the negative-electrode active-material particles little included relatively smaller fine particles. In the fine particles in the negative-electrode active-material particles, a film, which is formed on the surface, is likely to become thicker, so that cracks are likely to arise in the resulting film's superficial portion due to the negative-electrode active-material particles' volumetric changes. Since the negative-electrode active-material particles according to Battery Nos. 5 and 6 hardly included such fine particles, the negative-electrode active-material particles on which the resultant film had been damaged became extremely less, so that it was possible to suppress the electrolytic solution from deteriorating. Moreover, when the negative-electrode active-material particles' particle diameter becomes larger, the structure of a film that is formed on the surface becomes coarser, so that it is possible for Li ions to pass through the resulting film smoothly. On account of this, it is believed that the lithium-ion secondary batteries according to Battery Nos. 5 and 6 excelled in the cyclability.

Test on Charging/Discharging Cyclic Stability

Using the negative-electrode active material used in Battery No. 5, negative electrodes were made in which a mass ratio between the negative-electrode active-material particles, the natural graphite particles, KETJENBLACK and the polyamide-imide was "Negative-electrode Active-material Particles"/"Natural Graphite Particles"/"Acetylene Black"/"Polyamide-imide"=32/50/8/10 by percentage. Then, a test on charging/discharging cyclic stability was carried out in a case where the layer's thickness was altered. As shown in Table 5, a case where the negative-electrode active-material layer's thickness was set at 14.7 μm was labeled Negative Electrode No. 1, whereas another case where the negative-electrode active-material layer's thickness was set at 19 μm was labeled Negative Electrode No. 2. Negative Electrode Nos. 1 and 2 were an embodiment, respectively.

Secondary batteries were assembled as follows: the negative-electrode active-material layer was cut out by a predetermined area from two locations whose positions differed in the planar direction in each of Battery Nos. 1 and 2; and each of the negative-electrode active-material layer's cut-out sections was then assembled with a positive electrode possessing a positive-electrode active-material layer that had an identical mass with that of the cut-out section. For the electrolyte within the batteries, 1M (or mol/dm³) LiPF₆ was used. For the solvent, a solvent was used which was prepared by mixing the components in such a blending ratio as FEC/EC/EMC/DMC=4/26/30/40 by volumetric percentage.

TABLE 5

| | Negative-electrode Active-material Layer | | | | Electrolytic Solution | |
|---|---|---|---|---|---|---|
| | Layer Thickness (μm) | Layer Thickness/ "D₉₀" | Layer Thickness/ "D₅₀" | Layer Thickness/ "D₁₀" | Electrolyte | Solvent (% by volume) |
| Negative Electrode No. 1 | 14.7 | 1.6 | 2.3 | 3.3 | 1M LiPF₆ | FEC/EC/EMC/DMC = 4/26/30/40 |

TABLE 5-continued

| | Negative-electrode Active-material Layer | | | | Electrolytic Solution | |
| --- | --- | --- | --- | --- | --- | --- |
| | Layer Thickness (μm) | Layer Thickness/ "$D_{90}$" | Layer Thickness/ "$D_{50}$" | Layer Thickness/ "$D_{10}$" | Electrolyte | Solvent (% by volume) |
| Negative Electrode No. 2 | 19 | 2.1 | 3.0 | 4.3 | 1M LiPF$_6$ | FEC/EC/EMC/DMC = 4/26/30/40 |

A charging/discharging cyclic test was carried out at 25° C. while setting the charging condition at CC (i.e., constant current) charging at 1 C up to 4.2 V and setting the discharging condition at CC discharging at 2 C down to 3 V. The first charging/discharging test following the conditioning treatment was labeled the first cycle, and the identical charging/discharging operation was then carried out repeatedly up to the 500th cycle.

Figure 9:
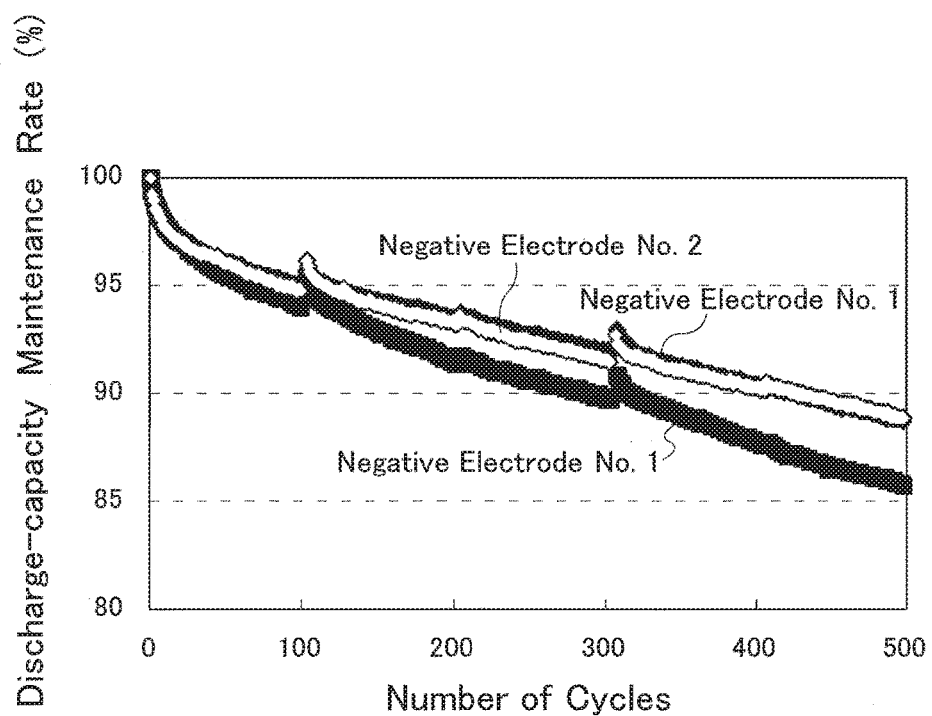
FIG. 9 is a diagram that shows the results of a charging/discharging cyclic stability test for Negative Electrode Nos. 1 and 2.

As shown in FIG. 9, two cut-out pieces according to Negative Electrode No. 1 (i.e., black lined fragments in FIG. 9) had discharge-capacity maintenance rates that differed one another. One of them according to Negative Electrode No. 1 showed a discharge-capacity maintenance rate that was the same extent as the discharge-capacity maintenance rate that Negative Electrode No. 2 showed, whereas the other one of them showed a discharge-capacity maintenance rate that was lower than the discharge-capacity maintenance rate that Negative Electrode No. 2 showed. In the two cut-out pieces according to Negative Electrode No. 1, the difference between the discharge-capacity maintenance rates widened as the number of charging/discharging cycles increased. On the other hand, the two cut-out pieces according Negative Electrode No. 2 (i.e., the blanked-out lined fragments in FIG. 9) showed the discharge-capacity maintenance rates that were identical with each other. It was understood from this that the batteries using Negative Electrode No. 2 excelled in the cyclic stability, whereas the batteries using Negative Electrode No. 11 was worse in the cyclic stability. The reason is believed to be as follows.

Both Negative Electrode Nos. 1 and 2 used the same negative-electrode active-material particles, and the entire negative-electrode active-material particles within the negative-electrode active-material layer had a particle diameter of 2 μm or more. In this instance, since the negative-electrode active-material particles' particle diameter became 2 μm or more within the negative-electrode active-material layer, dents and projections were formed between relatively large particles 11 in the negative-electrode active-material particles that existed in the surface of the negative-electrode active-material layer 1 as shown in FIG. 6, and thereby the dented portions 10 of the dents and projections could not be filled up with fine particles in the negative-electrode active-material particles, so that the resulting surface roughness of the negative-electrode active-material layer 1 became larger.

Since both Negative Electrode Nos. 1 and 2 had the negative-electrode active-material layer whose thickness was four times or more with respect to the negative-electrode active-material particles' "$D_{90}$," the resulting cyclability was stabilized relatively.

Like Negative Electrode No. 1, when the negative-electrode active-material layer' thickness is less than 2.0 times with respect to the negative-electrode active-material particles' "$D_{90}$," differences are likely to arise in the thickness depending on the negative-electrode active-material layer's parts. At the thinner parts in the negative-electrode active-material layer 1, electrolytic solutions are likely to permeate deep down into the inside. In this instance, when cracks are generated in a film formed on the negative-electrode active-material particles' surface, negative-electrode active materials constituting the negative-electrode active-material particles are likely to contact with the electrolytic solutions, so that the resulting cyclability is likely to decline. On the other hand, at the thicker parts in the negative-electrode active-material layer 1, the electrolytic solutions are less likely to permeate deep down into the inside. Consequently, even when cracks have arisen in the film, the electrolytic solutions are less likely to contact with the negative-electrode active material, compared with the thinner parts, so that the resultant cyclability is less likely to decline. On account of this, fluctuations were more likely to arise in the resulting cyclability in Negative Electrode No. 1 than in Negative Electrode No. 2.

On the contrary, in Negative Electrode No. 2, since the negative-electrode active-material layer' thickness was 2.0 times or more with respect to the negative-electrode active-material particles' "$D_{90}$," differences were less likely to arise in the thickness depending on the negative-electrode active-material layer's parts. Consequently, large dents and projections were less likely to be formed in the surface of the negative-electrode active-material layer 1. Consequently, fluctuations became less in the negative-electrode active-material layer's thickness in Negative Electrode No. 2 than in Negative Electrode No. 1, so that the resulting charging/discharging cyclability was stabilized more.

The lithium-ion secondary battery according to the fourth mode of the present invention was manufactured in seven kinds, namely, Battery Nos. 7 through 13, as follows. Then a charging/discharging cyclic evaluation test was carried out. Battery Nos. 7 through 11 were reference examples relevant to the present invention, whereas Battery Nos. 12 and 13 were embodiments according to the present invention.

Battery No. 7

First of all, a commercially available SiO powder was put in a ball mill, and was then subjected to milling at a revolving speed of 450 rpm in an Ar atmosphere for 20 hours, and was thereafter subjected to a heat treatment that was carried out in an inert gas atmosphere under a temperature of 900° C. for 2 hours. Thus, the SiO powder was disproportionated, and thereby negative-electrode active-material particles were obtained. Upon carrying out an X-ray diffraction (or XRD) measurement that employed CuKα for the resulting negative-electrode active-material particles, the specific peaks deriving from elementary-substance silicon and silicon dioxide could be ascertained. On account of this, it was understood that elementary-substance silicon and silicon dioxide were generated in the negative-electrode active-material particles.

Figure 10:
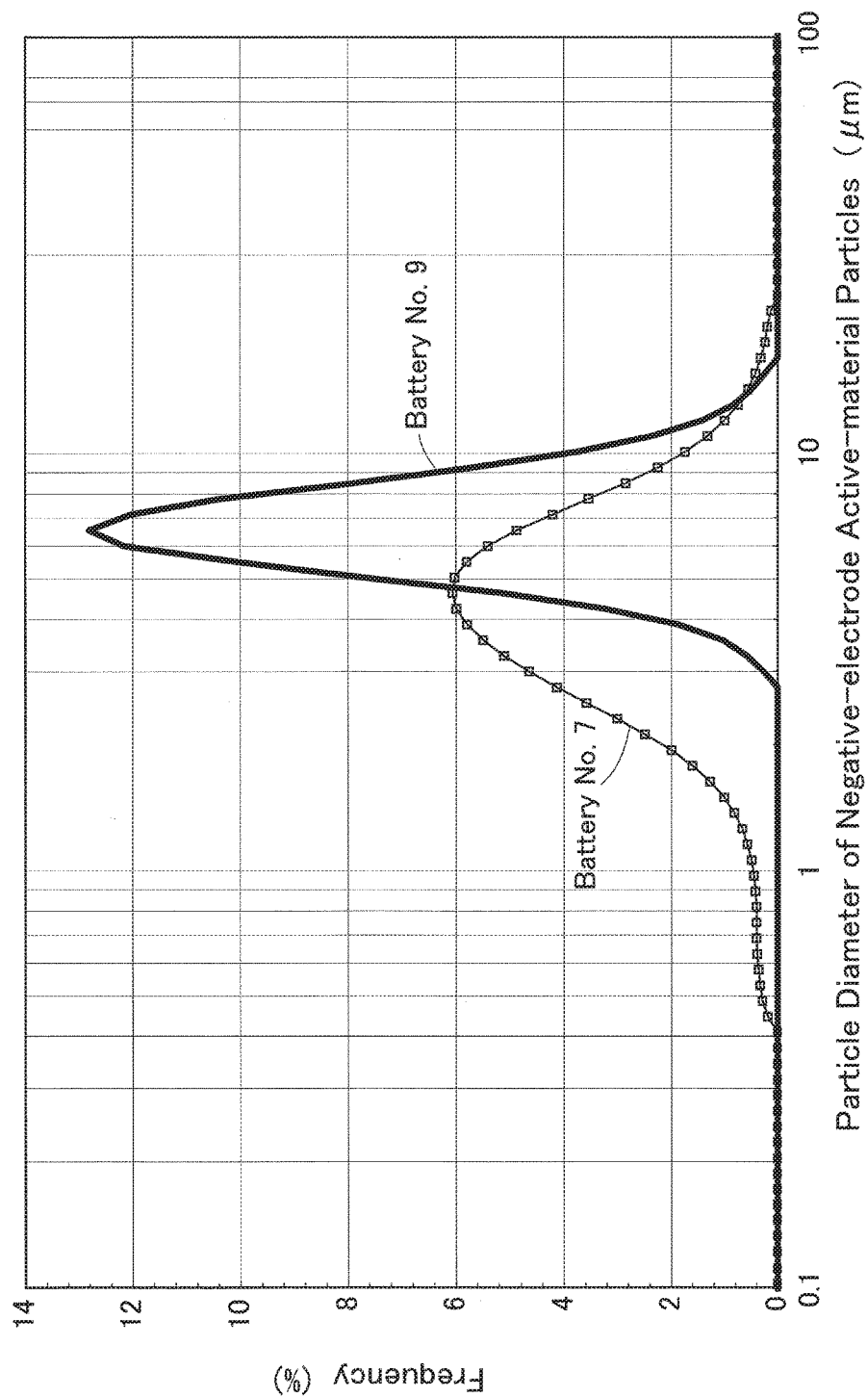
FIG. 10 is a diagram that shows the grain-size distributions of negative-electrode active-material particles that were used in lithium-ion secondary batteries according to Battery Nos. 7 and 9.

The disproportionated negative-electrode active-material particles' grain-size distribution was measured, and those results are shown in FIG. 10. Moreover, as shown in Table 6, the negative-electrode active-material particles' BET specific area was 6.6 m$^2$/g, and their "$D_{10}$" "$D_{50}$" and "$D_{90}$" were 1.4 μm, 4.4 μm and 8.0 μm, respectively. Their grain size was from 0.34 to 18.5 μm. When the entire negative-electrode active-material particles were taken as 100% by volume, particles whose particle diameter was 1 μm or more accounted for 93.3% by volume.

The thus prepared respective negative-electrode active-material particles, a natural graphite powder and KETJEN-BLACK that served as conductive additives, and polyamide-imide that served as a binding agent were mixed one another, and then a solvent was added to them, thereby obtaining a slurry-like mixture. The solvent was N-methyl-2-pyrrolidone (or NMP). A mass ratio between the negative-electrode active-material particles, the natural graphite particles, KETJENBLACK and the polyamide-imide was "Negative-electrode Active-material Particles"/"Natural Graphite Particles"/"KETJENBLACK"/"Polyamide-imide"=42/40/2/3/15 by percentage.

Next, the slurry-like mixture was formed as a film on one of the opposite faces of a copper foil, namely, a current collector, using a doctor blade, was pressed under a predetermined pressure, was heated at 200° C. for two hours, and was left to cool. Thus, a negative electrode was formed which was completed by fixating a negative-electrode active-material layer onto a surface of the current collector.

Next, a lithium-nickel-based composite oxide that served as a positive-electrode active material, namely, LiNi$_{1/3}$Co$_{1/3}$Mn$_{1/3}$O$_2$, acetylene black, and polyvinylidene fluoride (or PVDF) that served as a binding agent were mixed one another to turn them into a slurry. Then, the resulting slurry was coated onto one of the opposite faces of an aluminum foil that served as a current collector, was pressed, and was calcined. A mass ratio between the lithium-nickel-based composite oxide, the acetylene black, and the polyvinylidene fluoride was set at "Lithium-nickel-based Composite Oxide"/"Acetylene Black"/"Polyvinylidene Fluoride"=88/6/6. Thus, a positive electrode was obtained which was completed by fixating a positive-electrode active-material layer onto a surface of the current collector.

A polypropylene porous membrane that served as a separator was tucked between the positive electrode and the negative electrode. The resulting electrode assembly that comprised the positive electrode, the separator and the negative electrode was stacked one after another in a quantity of multiple pieces. Two pieces of aluminum films were sealed by doing heat adhesion at the circumference except for one of the sides, and were thereby turned into a bag shape. The stacked electrode assemblies were put into the bag-shaped aluminum films, and then an electrolytic solution further then put into it. The electrolytic solution had been completed by dissolving LiPF$_6$ serving as an electrolyte in an organic solvent. The organic solvent was prepared by mixing ethylene carbonate (or EC), ethyl methyl carbonate (or EMC) and dimethyl carbonate (or DMC) in such a blending ratio as EC/EMC/DMC=30/30/40 by volumetric percentage. A concentration of the LiPF$_6$ in the electrolytic solution was 1 mol/L (or M).

Thereafter, the aluminum films' opening side was sealed air tightly completely while doing vacuuming. On this occasion, the electrode assemblies' positive-electrode-side and negative-electrode-side leading ends were projected from out of the films' end rim in order to make them connectable with external terminals, thereby obtaining a lithium-ion secondary battery.

A conditioning treatment was carried out to the lithium-ion secondary battery. In the conditioning treatment, a charging/discharging operation was carried out as many as three rounds repeatedly. In the first round, the charging condition was set at CC-CV (i.e., constant current-constant voltage) charging at 0.2 C and 4.1 V, and the discharging condition was set at CC discharging at 0.2 C down to 3 V cut-off. In the second round, the charging condition was set at CC-CV charging at 0.2 C and 4.1 V, and the discharging condition was set at CC discharging at 0.1 C down to 3 V cut-off. In the third round, the charging condition was set at CC-CV charging at 1 C and 4.2 V, and the discharging condition was set at CC discharging at 1 C down to 3 V cut-off. After the conditioning treatment, the lithium-ion secondary battery was put back to an ordinary temperature (e.g., 25° C.).

Battery Nos. 8 and 9

A cyclone classification was carried out to the negative-electrode active-material particles used in Battery No. 7. In the cyclone classification, a cyclone classification was carried out using a powder classifying machine (e.g., "TURBO CLASSIFIER," a product of NISSIN ENGINEERING) under the following conditions: the classifying rotor's diameter: 300 mm; the number of revolutions: 7,000 rpm; the overall air amount: 2.0 m$^3$/minute; and the supply amount of the negative-electrode active-material particles: 1 kg/hour. The negative-electrode active-material particles, which had been charged into the classifying rotor, received centrifugal forces, which resulted from the rotary classification, and drag forces, which resulted from air flowing radially toward the center. Of these particles, coarser particles, in which such a relationship as "(Centrifugal Force)>(Drag Force)" was established, were caused to fly toward the outside of the classifying rotor, whereas finer particles, in which such another relationship as "(Centrifugal Force)<(Drag Force)" was established, were caused to move together with the air radially toward the center. The finer particles, which had been caused to move toward the classifying rotor's center, were used as the negative-electrode active-material particles in Battery No. 8. The coarser particles, which had been caused to fly outward, were used as the negative-electrode active-material particles in Battery No. 9.

The finer particles used in Battery No. 8 had a BET specific surface area that was 9.5 m$^2$/g, a "$D_{10}$" that was 0.8 μm, a "$D_{50}$" that was 2.7 μm, a "$D_{90}$" that was 5.0 μm, and a grain-size range that was from 0.37 μm to 11.0 μm. When the recovered negative-electrode active-material particles used in Battery No. 8 as a whole were taken as 100% by volume, particles whose particle diameter was less than 2 μm accounted for 33% by volume.

As shown in Table 6, the coarser particles used in Battery No. 9 had a BET specific surface area that was 2.8 m$^2$/g, a "$D_{10}$" that was 4.4 μm, a "$D_{50}$" that was 6.4 μm, a "$D_{90}$" that was 9.2 μm, and a grain-size range that was from 2.31 μm to 18.5 μm. When the recovered negative-electrode active-material particles used in Battery No. 9 as a whole were taken as 100% by volume, particles whose particle diameter was 2 μm or more accounted for 100% by volume. The grain-size distribution of the particles used in Battery No. 9 is shown in FIG. 10.

Other elements or features in lithium-ion secondary batteries according to Battery Nos. 8 and 9 were the same as those in the lithium-ion secondary battery according to Battery No. 7.

Battery No. 10

A cyclone classification was carried out to the negative-electrode active-material particles used in Battery No. 7, thereby preparing negative-electrode active-material particles used in Battery No. 10. The cyclone classification was carried out using the same apparatus as used when doing the classification for Battery Nos. 8 and 9 under the following conditions: the classifying rotor's diameter: 300 mm; the number of revolutions: 4,000 rpm; the overall air amount: 2.0 m$^3$/minute; and the supply amount of the negative-electrode active-material particles: 1 kg/hour. As shown in Table 6, the recovered negative-electrode active-material particles used in Battery No. 10 had a BET specific surface area that was 2.7 m$^2$/g, a "$D_{10}$" that was 5.4 μm, a "$D_{50}$" that was 7.2 μm, a "$D_{90}$" that was 10.0 μm, and a grain-size range that was from 3.27 μm to 18.5 μm. When the recovered negative-electrode active-material particles used in Battery No. 10 as a whole were taken as 100% by volume, particles whose particle diameter was 4 μm or more accounted for 99.3% by volume. Others were the same as those in the lithium-ion secondary battery according to Battery No. 7.

Battery No. 11

A lithium-ion secondary battery according to Battery No. 11 was manufactured with use of the negative-electrode active-material particles used in Battery No. 7. The lithium-ion secondary battery according to Battery No. 11 had, however, an organic solvent in the nonaqueous electrolytic solution that had been prepared by mixing fluoroethylene carbonate (or FEC), ethylene carbonate (or EC), ethyl methyl carbonate (or EMC) and dimethyl carbonate (or DMC) in such a blending ratio as FEC/EC/EMC/DMC=4/26/30/40 by volumetric percentage. Others were the same as those in the lithium-secondary battery according to Battery No. 7.

Battery No. 12

A lithium-ion secondary battery according to Battery No. 12 was manufactured with use of the negative-electrode active-material particles used in Battery No. 9. The lithium-ion secondary battery according to Battery No. 12 had, in the same manner as Battery No. 11, an organic solvent in the nonaqueous electrolytic solution that had been prepared by mixing the components in such a blending ratio as FEC/EC/EMC/DMC=4/26/30/40 by volumetric percentage. Others were the same as those in the lithium-ion secondary battery according to Battery No. 7.

Battery No. 13

A lithium-ion secondary battery according to Battery No. 13 was manufactured with use of the negative-electrode active-material particles used in Battery No. 10. The lithium-ion secondary battery according to Battery No. 13 had, in the same manner as Battery No. 11, an organic solvent in the nonaqueous electrolytic solution that had been prepared by mixing the components in such a blending ratio as FEC/EC/EMC/DMC=4/26/30/40 by volumetric percentage. Others were the same as those in the lithium-ion secondary battery according to Battery No. 7.

TABLE 6

| | Negative-electrode Active-material Particles | | | | | | Electrolytic Solution | |
|---|---|---|---|---|---|---|---|---|
| | BET Specific Surface Area (m$^2$/g) | "$D_{10}$" (μm) | "$D_{50}$" (μm) | "$D_{90}$" (μm) | Grain-size Range (μm) | | Solute | Solvent % by Volume |
| Battery No. 7 | 6.6 | 1.4 | 4.4 | 8.0 | 0.34-18.5 | 1 μm or more in an amount of 93.3% | 1M LiPF$_6$ | EC/EMC/DMC = 30/30/40 |
| Battery No. 8 | 9.5 | 0.8 | 2.7 | 5.0 | 0.37-11.0 | Less than 2 μm in an amount of 33% | " | EC/EMC/DMC = 30/30/40 |
| Battery No. 9 | 2.8 | 4.4 | 6.4 | 9.2 | 2.31-18.5 | 2 μm or more in an amount of 100% | " | EC/EMC/DMC = 30/30/40 |
| Battery No. 10 | 2.7 | 5.4 | 7.2 | 10.0 | 3.27-18.5 | 4 μm or more in an amount of 99.3% | " | EC/EMC/DMC = 30/30/40 |
| Battery No. 11 | 6.6 | 1.4 | 4.4 | 8.0 | 0.34-18.5 | 1 μm or more in an amount of 93.3% | " | FEC/EC/EMC/DMC = 4/26/30/40 |
| Battery No. 12 | 2.8 | 4.4 | 6.4 | 9.2 | 2.31-18.5 | 2 μm or more in an amount of 100% | " | FEC/EC/EMC/DMC = 4/26/30/40 |

TABLE 6-continued

| | Negative-electrode Active-material Particles | | | | | Electrolytic Solution | |
|---|---|---|---|---|---|---|---|
| | BET Specific Surface Area | "$D_{10}$" | "$D_{50}$" | "$D_{90}$" | Grain-size Range | | Solvent |
| | ($m^2/g$) | (μm) | (μm) | (μm) | (μm) | Solute | % by Volume |
| Battery No. 13 | 2.7 | 5.4 | 7.2 | 10.0 | 3.27-18.5 | 4 μm or more in an amount of 99.3% | " | FEC/EC/EMC/DMC = 4/26/30/40 |

Discharging/Charging Cyclic Evaluation Test

A charging/discharging cyclic test was carried out for lithium-ion secondary batteries according to Battery Nos. 7 through 13. The testing conditions were set in the same manner as those for Battery Nos. 1 through 6.

Figure 11:
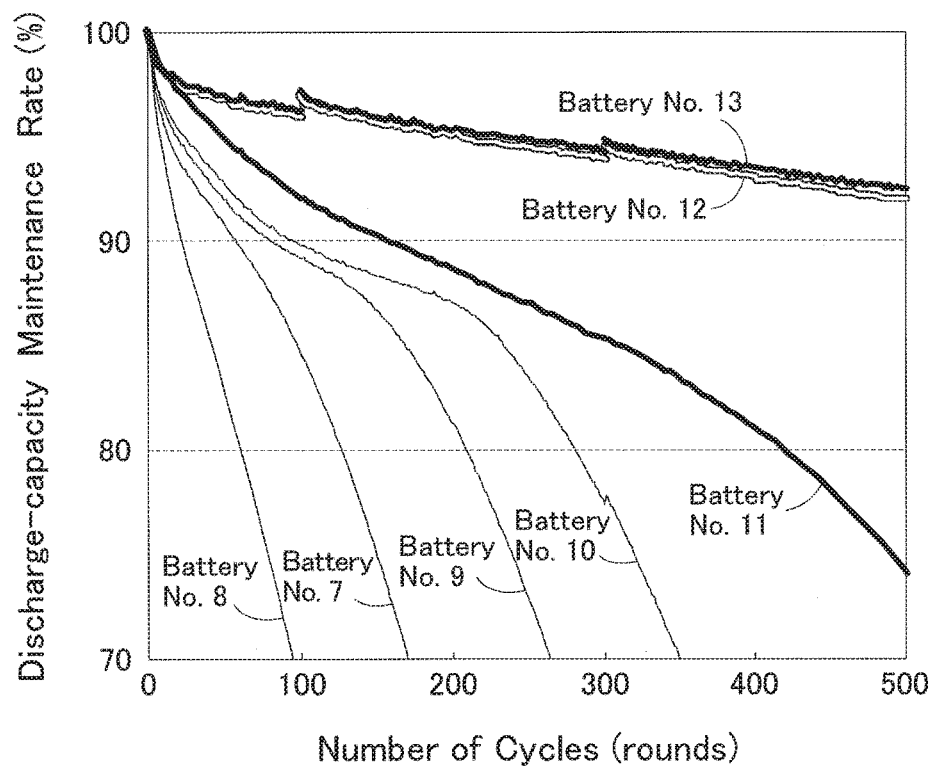
FIG. 11 is a diagram that shows the results of a charging/discharging cyclic evaluation test for lithium-ion secondary batteries according to Battery Nos. 7 through 13.

As shown in FIG. 11, the cyclability upgraded in the order of Battery Nos. 8, 7, 9 and 10. This indicates that the larger the negative-electrode active-material particles' "$D_{10}$" and "$D_{50}$" became, and moreover the smaller the negative-electrode active-material particles' specific surface area became, the more the resulting cyclability upgraded.

Battery No. 11, which comprised FEC that was added to the organic solvent in the nonaqueous electrolytic solution, exhibited the markedly upgraded cyclability, compared with those of Battery Nos. 7 through 10 free from the FEC addition. This is believed to result from the following: FEC became one of the constituent components of LiF within an SEI film, and thereby the resulting SEI film is generated stably and firmly, so that the negative-electrode active material was inhibited from contacting directly with the electrolytic solution, and thereby the electrolytic solution was suppressed from decomposing.

Battery Nos. 11 and 12 exhibited the remarkably upgraded cyclability, compared with that of Battery No. 10. This is because of the following: FEC was added to the nonaqueous electrolytic solution; the entirety of the negative-electrode active-material particles further exhibited 2 μm or more in Battery No. 12; and particles having 4 μm or more accounted for 99.3% in Battery No. 13 when the entirety of the negative-electrode active-material particles was taken as 100% by volume, so that the negative-electrode active-material particles little included relatively smaller fine particles. In the fine particles in the negative-electrode active-material particles, a film, which is formed on the surface, is likely to become thicker, so that cracks are likely to arise in the resulting film's superficial portion due to the negative-electrode active-material particles' volumetric changes. Since the negative-electrode active-material particles used in Battery Nos. 12 and 13 hardly included such fine particles, the negative-electrode active-material particles on which the resultant SEI film had been damaged became extremely less, so that it was possible to suppress the electrolytic solution from deteriorating. Moreover, when the negative-electrode active-material particles' particle diameter becomes larger, the structure of an SEI film that is formed on the surface becomes coarser, so that it is possible for Li ions to pass through the resulting film smoothly. On account of this, it is believed that the lithium-ion secondary batteries according to Battery Nos. 12 and 13 excelled in the cyclability.

EXPLANATION ON REFERENCE NUMERALS

1: Negative-electrode Active-material Layer;
2: Current Collector; and
10: Dented Portions

The invention claimed is:

1. A negative electrode for lithium-ion secondary battery being characterized in that:
the negative electrode comprises:
a current collector; and
a negative-electrode active-material layer formed on a surface of the current collector, and including negative-electrode active-material particles;
said negative-electrode active-material particles comprising:
an element being capable of sorbing and desorbing lithium ions, and being capable of undergoing an alloying reaction with lithium; or/and
an elementary compound being capable of undergoing an alloying reaction with lithium;
said negative-electrode active-material particles including particles whose particle diameter is 1 μm or more in an amount of 85% by volume or more thereof when the entirety is taken as 100% by volume;
said negative-electrode active-material particles exhibit a "$D_{10}$" being 3 μm or more, and a "$D_{90}$" of 10.5 μm or less, and
said negative-electrode active-material layer having a thickness that is 1.4 times or more of a "$D_{90}$" that said negative-electrode active-material particles exhibit.

2. The negative electrode for lithium-ion secondary battery as set forth in claim 1, wherein the thickness of said negative-electrode active-material layer is three times or more of a "$D_{10}$" that said negative-electrode active-material particles exhibit.

3. The negative electrode for lithium-ion secondary battery as set forth in claim 1, wherein a ratio of a "$D_{50}$," which said negative-electrode active-material particles exhibit, with respect to the "$D_{90}$," which said negative-electrode active-material particles exhibit, is from 0.5 or more to 0.8 or less.

4. The negative electrode for lithium-ion secondary battery as set forth in claim 1, wherein a fraction of said negative-electrode active-material particles' mass is from 20% or more to 90% or less when said negative-electrode active-material layer's entire mass is taken as 100%.

5. The negative electrode for lithium-ion secondary battery as set forth in claim 1, wherein:
said element being capable of undergoing an alloying reaction with lithium is silicon or tin; and said elementary compound being capable of undergoing an alloying reaction with lithium is a silicon compound, or a tin compound.

6. A lithium-ion secondary battery comprising:

the negative electrode for lithium-ion secondary battery as set forth in claim 1;

a positive electrode including a positive-electrode active material that enables lithium ions to be sorbed therein and desorbed therefrom; and an electrolyte.

* * * * *